US012738624B2

(12) United States Patent
Tymofieiev

(10) Patent No.: US 12,738,624 B2
(45) Date of Patent: Sep. 15, 2026

(54) METHOD AND APPARATUS FOR A COAXIAL HIGH POWER RF COMBINER

(71) Applicant: SCIENTIFIC COMPONENTS CORPORATION, Brooklyn, NY (US)

(72) Inventor: Yevhen Tymofieiev, Nijmegen (NL)

(73) Assignee: Scientific Components Corporation, Brooklyn, NY (US)

(*) Notice: Subject to any disclaimer, the term of this patent is extended or adjusted under 35 U.S.C. 154(b) by 140 days.

(21) Appl. No.: 18/519,881

(22) Filed: Nov. 27, 2023

(65) Prior Publication Data

US 2024/0178541 A1 May 30, 2024

Related U.S. Application Data

(60) Provisional application No. 63/428,607, filed on Nov. 29, 2022.

(51) Int. Cl.

*H01P 5/16* (2006.01)
*H01B 3/44* (2006.01)
*H01P 3/06* (2006.01)
*H01P 11/00* (2006.01)

(52) U.S. Cl.

CPC ............... *H01P 5/16* (2013.01); *H01B 3/445* (2013.01); *H01P 3/06* (2013.01); *H01P 11/005* (2013.01)

(58) Field of Classification Search

CPC . H01P 5/16; H01P 3/06; H01P 11/005; H01B 3/445

See application file for complete search history.

(56) References Cited

U.S. PATENT DOCUMENTS 4,035,746 A * 7/1977 Covington, Jr. .......... H01P 5/12 333/127
4,240,051 A * 12/1980 Haugsjaa .................. H01P 5/12 333/127
4,684,874 A * 8/1987 Swift ........................ H01P 5/12 333/125
9,419,323 B2 * 8/2016 Shinohara ................. H01P 5/12
10,770,775 B2 * 9/2020 Kinsey ....................... H01P 3/06
11,764,454 B1 * 9/2023 Podell ........................ H01P 5/08 455/127.1
2023/0344104 A1 * 10/2023 Crouch ...................... H01P 5/16

FOREIGN PATENT DOCUMENTS

CN 109216850 A * 1/2019 ................ H01P 5/12

* cited by examiner

*Primary Examiner* — Andrea Lindgren Baltzell
*Assistant Examiner* — Kimberly E Glenn
(74) *Attorney, Agent, or Firm* — Lawrence G. Fridman, Esq; FEIGIN & FRIDMAN, LLC

(57) ABSTRACT

A high power electrical signal power combiner including coaxial and integrated waveguide structures, and including thermal stress relief elements and impedance transformation elements is designed and constructed.

17 Claims, 15 Drawing Sheets

METHOD AND APPARATUS FOR A COAXIAL HIGH POWER RF COMBINER

CROSS-REFERENCE TO RELATED APPLICATIONS

This application claims the benefit of U.S. Provisional Application Ser. No. 63/428,607 filed by the applicant on Nov. 29, 2022, which is incorporated in its entirety herein by reference.

FIELD OF THE INVENTION

The present invention relates generally to high power electronic devices, and in particular to high power radio frequency (RF) power divider and high power RF power combiner devices.

BACKGROUND OF THE INVENTION

High frequency coaxial combiners may be limited to lower radio frequency (RF) power handling, due to local overheating of a central conductor of a coaxial transmission line or a center conductor of a strip line microwave circuit construction.

There remains a need for a device and technique to perform these functions using at a higher frequency and at a higher RF signal power.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
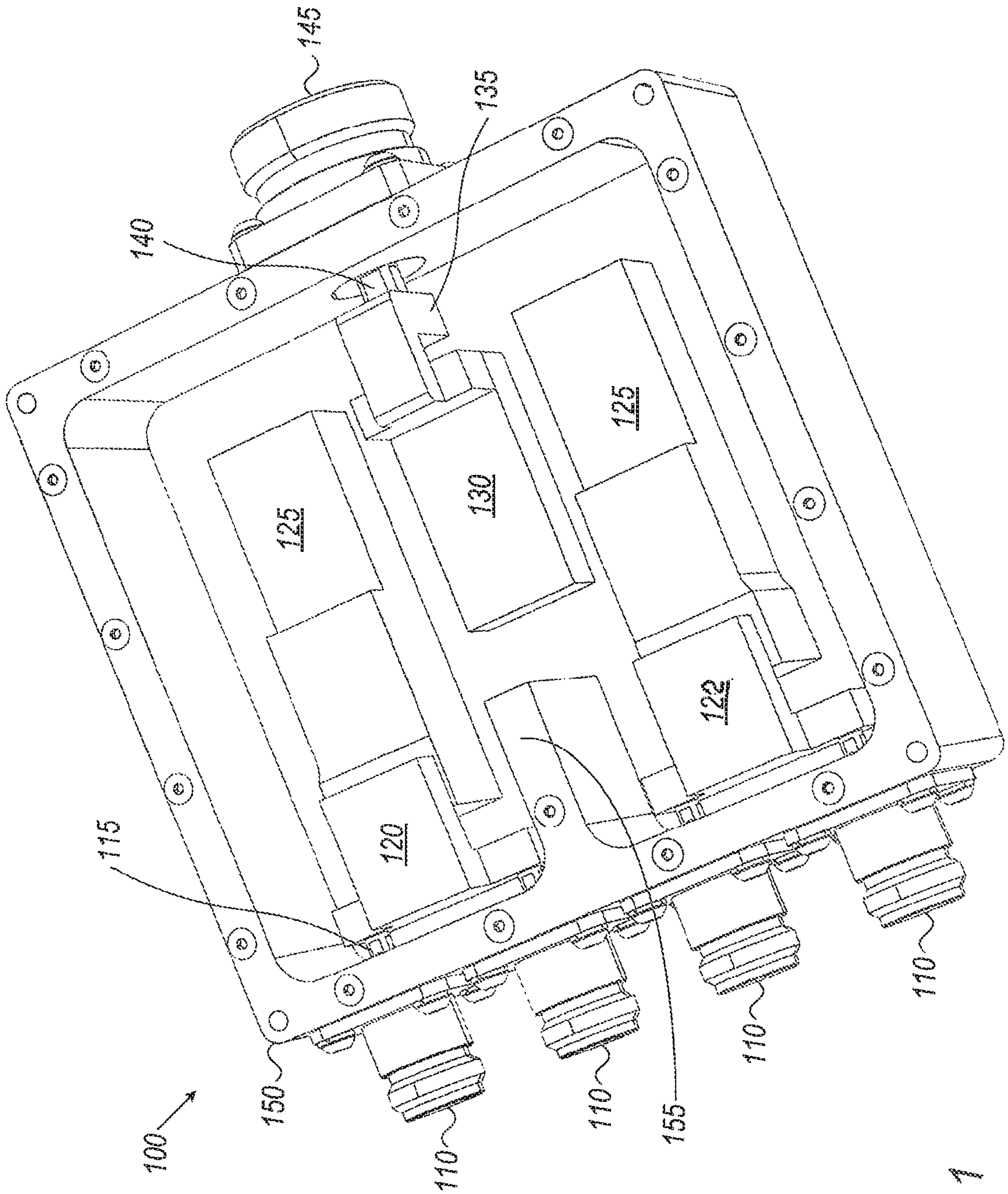
FIG. 1 depicts an exemplary diagram according to embodiments of the invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the invention may be practiced without these specific details. In other instances, well-known methods, procedures, and components have not been described in detail so as not to obscure the invention.

According to embodiments of the invention, radio frequency (RF) devices for dividing input signal power and/or energy among a plurality of output ports are referred to as power dividers (PD). Such devices may be reciprocal such that they may receive input signal power and/or energy from a plurality of ports, now used as input ports, and combine such signal power and/or energy into one output port, referred to as an input port when used as a PD, and may be referred to as a power combiner (PC). Such reciprocal devices may be referred to as a PC, and it may be understood that a device is capable of operation as both a PD and a PC, according to its reciprocal nature and/or construction. A PC and/or PD may also be referred to as a power splitter (PS).

A PS may be constructed by a variety of methods and by utilizing a selection of several materials, all with properties that work well with RF signals. Such signals may be in the microwave frequency range, e.g. 300 MHz to 300 GHz, and/or other higher frequencies, lower frequencies and/or any combination of such frequencies. A PS may be operable over and/or within any such signals. A PS may be, for example, a coaxial combiner, e.g., for high power signals, and/or lower power signals and/or applications, and may be operable over a plurality of combinations of such signal frequencies and/or signal powers.

Coaxial combiners, e.g., high-frequency coaxial combiners, may be limited in power, for example, due to local overheating of a central conductor that may be in a coaxial transmission line, a microstrip transmission line, a strip line transmission line, or the like. Electrical signals that may have, e.g., contain, be comprised of, etc., high signal power may cause localized heating of transmission mediums carrying such signals. A transition from a coaxial medium to a waveguide, e.g., a single-ridged waveguide, and back to another such coaxial may eliminate a need, for example, of using specialized structures, e.g., suspended conductors, which may tend to suffer from overheating and/or other detrimental effects, where such specialized structures may be, for example, used to maintain electrical performance. A transition from coaxial to single-ridged waveguide and back to coaxial may help to cool down, for example, a central pin of a connector and may increase a power handling capability of such a connector, while, for example, simultaneously maintaining electrical performance.

Radio frequency (RF) and/or microwave amplifiers and/or generators for industrial, scientific, and manufacturing (ISM), telecom and/or radar applications, and/or other applications, may require, for example, kilowatts of power. High power at an output of a generator may be coming from, for example, power amplifier (PA) modules that may be working alone, or in parallel and then combined into a single output. A combiner according to embodiments of the invention may be used to combine RF signals, for example being emitted from outputs of PAs, and may produce a higher power combined RF signal.

In order to enable such combining, a high-power combiner, e.g., a high power coaxial combiner, may be used. Such a high-power coaxial combiner may be designed and/or manufactured to be used at high frequencies, e.g., RF and/or microwave frequencies. Such a high-power combiner may be a power combiner (PC), and may be operable to combine, e.g., add together, two or more signals, where at least one of such signals may be a high-power signal.

High-frequency coaxial combiners may be limited in power due to local overheating of a central conductor in a coaxial or strip line. A coaxial transmission line may refer to any electrical signal transmission line that may have a cylindrical center conductor, e.g., an inner conductor, and may be radially surrounded by an insulating material, and such insulating material may be radially surrounded by a second conductor, e.g., an outer conductor. Such outer conductor may be referred to as a ground shield, a ground conductor, a ground plane, a signal return conductor, and/or the like. A strip line may refer to any electrical signal transmission line that may have a planar conductor and/or a conductor having a rectangular cross-section, separated from a ground plane, a ground conductor, a ground return, etc., by an insulative material, where such insulative material may be above, below, around, and/or another geometrical position such planar conductor. A strip line may be, for example, a microstrip transmission line, a stripline transmission line, a coplanar transmission line and/or other similar transmission lines.

A transition from coaxial to a single-ridged waveguide and/or back to coaxial may eliminate a need of using, for example, suspended conductors which such suspended conductors may tend to suffer from overheating.

A transition from, for example, coaxial to a single-ridged waveguide and/or back to coaxial may help, for example, to cool down a central pin of a connector and may significantly increase a power handling capability of a particular connector type.

A transition, for example, a U-shaped transition, e.g., a mechanical transition in a shape that may resemble a "U"-shape, may be from coaxial to, for example, a single-ridged waveguide, and may, for example, release and/or reduce mechanical stress, for example as compared to another transition mechanical structure.

A waveguide may be rectangular waveguide, or may be a single-ridged waveguide, or may be another type of waveguide. A waveguide, for example, a single-ridged waveguide, may reduce a size of a combiner structure and/or circuit, for example, a size that may be dependent on frequencies over which such waveguide may be operable.

A transition, for example, from coaxial to a single-ridged waveguide, may be designed, for example, for 25R, for less than 25R, or other values, where, for example, two, or more, 50R inputs may be connected in parallel and may be connected to, for example, one waveguide. Such a configuration may, for example, increase a number of inputs, for example, within the same combiner and/or combiner size. 25R may refer to an electrical impedance of 25 ohms, 50R may refer to an electrical impedance of 50 ohms, etc. For example, a 50 ohms impedance connected in parallel with a second 50 ohms impedance may have a total impedance of 25 ohms.

An output of a combiner may be a coaxial connection or waveguide connection or other suitable connection type.

Radio Frequency (RF) generators, for example, operating in a 0.4-5 GHz frequency range may be used, for example, in different industrial, scientific, and/or medical (ISM) applications. Some embodiments may be based, for example, on vacuum tubes. A single vacuum tube, e.g., a magnetron, may deliver high RF power, for example, in a frequency range of 1 to 100 KW, and its lifetime may be limited. An output power and/or frequency of a magnetron may be drifting, for example, with time and temperature, and may affect a quality and/or precision of processes, for example, where an RF generator may be used. Such a magnetron may be configured to be an RF signal amplifier. An RF signal output of such an amplifier may be combined, for example by a combiner, e.g., a high-power combiner, to form a higher power RF signal power output.

In some embodiments, a new and, for example, state-of-the-art Very High-Power Solid-State Generator for 2.4-2.5 GHz ISM applications, such as plasma generators, for example, for a semiconductor industry or production of hydrogen for the energy transition, food processing, cancer treatment, etc., or other applications, may be designed and/or manufactured. Some embodiments may provide better accuracy and/or additional functionality, for example, such as frequency sweep, fast pulse width modulation, and may solve reliability issues that may have been associated, for example, with a short lifetime, e.g., of vacuum tubes.

In some embodiments, a single solid-state generator element, for example, an amplifier and/or part of an amplifier, e.g., a transistor, may deliver, for example, an amount of RF power, e.g., 250 watts (W) of RF power. Outputs of two or more transistors may need to be combined, for example, in parallel. To realize such a configuration, a combining system may be developed. An innovative hybrid power combiner technique, for example, using principles of waveguide combining for example, in a low-cost coaxial realization. Development, design and/or manufacture of a higher power amplifier and/or a combining system that may handle such increased heat and/or that may be cost-effective may be completed.

In some embodiments, solid-state amplifier output RF power may be limited, for example, in power, e.g., to approximately 250 W. To reach a level of, for example, 8 KW, two or more outputs of many of such amplifiers may be combined. A solid-state solution may be combining power from two or more, for example, tens or hundreds, of transistors, transistor amplifiers and/or other amplifiers. Exemplary types of power combiners that may be for, for example, covering a 2.4 GHz-2.5 GHz frequency range may be, for example, coaxial line and waveguide. Other types, configurations, etc. may be possible.

Some embodiments may have a coaxial line connection, for example for connecting an input and/or an output to preceding and/or successive circuits and/or components. In consideration of a coaxial line, a bigger coaxial line may handle higher power, e.g., RF signal power, or may have higher power handling capability. A maximum size of a coaxial line may be limited by a wavelength of a signal, for example an electromagnetic signal, an electrical power signal, etc. For example, at a frequency covering 2.4 GHz-2.5 GHZ, a wavelength of a signal may be relatively small, and may mean a power handling capability of a coaxial combiner may be limited, for example by a geometry and/or size of such combiner and/or combiner component. Such a combiner may handle, for example, 1 kW of the RF power, e.g., at 2.5 GHz. Other power and/or frequency handling capabilities may be possible. Higher power at an input may, for example, cause local overheating, sparking and/or irreversible damage, for example, to a generator. A waveguide combiner may have an advantage, for example, in comparison to a coaxial line type, where such waveguide type may handle much higher power, for example that may reach hundreds of kilowatts. A waveguide alone may be bulky and/or difficult to produce or manufacture, and embodiments of the invention may solve such issues.

An embodiment of the invention may be a new hybrid solution, for example a combination of a compact coaxial input and a high-power waveguide-based body, e.g., mechanical chassis. Such a hybrid solution may solve a technically challenging problem, for example, a whole combiner component and/or structure, e.g., coaxial and/or waveguide, may need to be kept cool and/or small. Should there be, for example, an imbalance, e.g., in phase and/or amplitude of signals, within a combiner, such imbalance may damage, for example, an entire generator. It is desired to prevent any damage to such generator.

An embodiment of the invention may comprise, for example, a new combiner, for example a solid-state combiner, may be developed, designed and/or manufactured, and may incorporate one or more benefits of coaxial and/or waveguide solutions, for example a combiner designed and/or constructed using one or more features of a coaxial combiner and/or one or more features of a waveguide based combiner. Such a combiner may be small enough, for example having a size that may be proportional to a signal wavelength that may be associated with a signal frequency. Such an embodiment may, for example, simultaneously handle heat that may be generated and/or dissipated from operation of such embodiment, and may, for example, be able to overcome such heat dissipation distributed over such smaller surface area while maintaining acceptable performance, e.g., performance of electrical signal combining.

In some embodiments, a coaxial line may have a direct, e.g., electrical and/or mechanical, connection of a central pin to a coaxial connector. A central pin, e.g., a wire, and/or other electrical signal conductor, may be isolated from an outer side, for example, by a shield, e.g., an insulator, of insulative material, that may be around it. A wire in the middle, or substantially centered, as may be necessary for, for example, a constant electrical impedance, may experience elevated heat, e.g., get super-hot, for example when operating at high RF signal input power. In order to keep such wire cool there may be a transition, for example, where a pin may have a direct connection to an outer line, for example, so it may function according to electrical signal transmission and/or propagation, and may have substantial contact with a metal body, for example of a combiner. Such a configuration may conduct such heat and may also be, for example, isolating an inside from an outside, while simultaneously electrically functioning as a coaxial line, e.g., a coaxial electrical signal transmission line. A body of such a combiner may be small, e.g., having dimensions proportional to a wavelength and/or a fractional wavelength of an electrical signal operable within such combiner, and such small size may be achieved by designing and/or constructing a waveguide structure according to embodiments of the invention, e.g., a folded waveguide structure, wherein a waveguide structure may be reformulated, designed, manufactured, etc., along a line of symmetry of such structure, to be, for example, one-half an original structure. Such a structure according to embodiments of the invention may be referred to, for example, as a single ridged waveguide. Such a single ridge waveguide may be considered to be, for example, half of a double ridge waveguide and may have, for example, a horizontal perfect electrical conductor (PEC), e.g., a shaped metallic internal component, that may be inserted at a middle of a gap region, and such PEC may be located at a geometric center of such gap region. Folding may, for example, affect a power handling capability.

In some embodiments, a new, state-of-the-art Very High-Power Solid-State Generator may be designed and/or constructed, for example, for a predetermined frequency band, e.g., 2.4-2.5 GHZ, that may have a variety of applications, e.g., ISM applications, for example plasma generators for the semiconductor industry or the production of hydrogen for the energy transition, food processing, cancer treatment, or other applications. A combining system may be designed and/or constructed according to embodiments of the invention, for example, a hybrid power combiner technique using principles of a waveguide combiner and may also incorporate one or more features of a, for example, low-cost coaxial realization. Such design and/or construction of such combining system may be, for example, expensive, and may be optimized such that a new solid-state solution according to embodiments may become cost-effective, for example as comparable with other magnetron-based generators. Embodiments may be an innovative hybrid power combiner technique that may use one or more principles, e.g., theoretical principles, in a realization of such design and/or construction of a waveguide combiner and may be completed into a low-cost coaxial realization. Electromagnetic, thermal and/or mechanical co-simulation form part of the design to achieve, for example, maximum electrical performance and minimal losses, and keep a weight and/or a cost low.

In some embodiments a combiner may be a stand-alone component and in other embodiments such a combiner may be a sub-component, for example, within a system. A temperature, e.g., a temperature rise during operation while two or more high power RF signals may be being combined, of a central pin may be a significant parameter for a design of such a combiner. A combiner may have, for example, two 25-ohms impedance inputs that may be combined and then may be internally combined. Such a configuration may achieve, for example, a 50-ohms impedance as seen from an external component.

In some embodiments an insulator material, e.g., Polytetrafluoroethylene (PTFE), may be used as an insulator between a center conductor and an outer conductor of a coaxial connector, cable and/or interface, e.g., an input and/or an output interface. A thermal build-up may occur at such PTFE interface under high RF power conditions, and such thermal build-up may be prevented by using a waveguide structure, according to embodiments of the invention. Such thermal effects may be power, temperature and/or frequency dependent.

Some embodiments of the invention may use waveguide as a cooling structure for a combiner. When such waveguide may be used, there may be no need for additional thermal dissipation elements. Such waveguide may have a metallic surface area, which may distribute, radiate and/or dissipate heat over such a surface area.

In some embodiments a current probe version of a waveguide structure may be used. Such a current probe may be designed to be similar to, for example, a current loop. A combiner structure may be galvanically isolated from a structure of a combiner. A transformer may be used to bring a signal from an input to a combiner structure and may have a limited surface area. Such limited surface area may have a limit on heat dissipation.

A mechanical stress on a center pin and/or connector may be a thermally derived source of stress. Such stress may be from thermal expansion, for example due to heating of a conductor that may be carrying a high power RF signal, and/or may be from thermal contraction, for example due to a cooling of a conductor that may no longer be carrying a high power RF signal. There may be, for example, a longitudinal stress, and a stress relief loop of a mechanical pin-to-waveguide attachment may be used, for example, to relieve such stress. Such stress may affect, for example, a PTFE release, for example, from a longitudinal stress.

Embodiments of the invention may include one or more of a stress loop, a waveguide in place of a metal center conductor, a plate, e.g., a brass plate, that may be used as, for example, a push connect for an electrical and/or mechanical connection, e.g., a press fit connection, a signal combiner that may be near a device and/or component input and that may be, for example any binary combining circuit, e.g., a 4-way combiner, and a channel, e.g., a waveguide channel that may have an input impedance of 50 ohms, an impedance conversion to 25 ohms and a second impedance conversion, for example, back to 50 ohms. Other impedance transformations among other impedances may be possible. A combiner may be designed and/or constructed to be well matched to a system impedance, e.g., 50 ohms, and be matched at one or more inputs and an output. A combiner may have two or more inputs, e.g., a number of inputs that may be a multiple of 2, and may have one output. Such a combiner may operate to combine two or more RF signal inputs, and may be a power combiner. Such a combiner may operate in a reverse direction, for example as a divider, or power divider.

Embodiments of the invention may be understood with reference to FIG. 1. An exemplary device may be an RF signal combiner 100 and such a combiner may have two or more inputs 110, e.g. four inputs 110. Such a combiner may have an output 145. Such input 110 and/or output 145 may have a connector, e.g., an N-Type connector, affixed to an exterior of such combiner 100, and may have a center conductor, e.g., a coaxial center conductor, extending into an interior of such combiner 100. Such conductor may be insulated from a surrounding housing of such combiner 100, and may be operable to transfer electrical signals into and/or out from such a combiner 100, e.g., as a coaxial transmission line. Such a combiner may be designed and/or constructed according to embodiments of the invention. A coaxial center conductor may be attached to a coaxial to waveguide transition 115, and such transition may be operable to carry electrical signals. A waveguide transition may be connected to a first waveguide combiner/junction 120 and a second waveguide combiner/junction 122, and such waveguide combiners/junctions 120,122 may be operable as an impedance transformer. Such combiners/junctions 120,122 may be operable to combine, e.g., power combine, two electrical signals, for example, two electrical signals that may have been input from waveguide transition 115, and such combined electrical signal, e.g., having the sum of a power of each of the input electrical signals, may be output to a waveguide. Such waveguide carrying an output of the combiners/junctions 120,122 may be, for example, a single ridged waveguide 125. Such single ridged waveguide may carry an electrical signal from the combiners/junctions 120, 122 to waveguide combiner 130, and such waveguide combiner 130 may be for example, a single ridged waveguide combiner 130. Such a single ridged waveguide combiner 130 may be operable together with two single ridged waveguide 125 to combine, e.g., power combine, for example, two electrical signals that may have been input from waveguide transition single ridged waveguide 125, and such combined electrical signal, e.g., having the sum of a power of each of the input electrical signals, may be output to a waveguide mechanical stress relief 135, and then to waveguide to coaxial transformer 140. A single ridged waveguide combiner 130 may be attached to a waveguide to coaxial transformer 140 by, for example, a waveguide mechanical stress relief and attachment 135. Such waveguide to coaxial transformer 140 may be a transition, and may be attached to a coaxial transmission line, and such transition may be operable to carry electrical signals. Such waveguide to coaxial transformer 140 may have a center conductor, e.g., a coaxial center conductor, extending from an interior of such combiner 100. Such conductor may be insulated from a surrounding housing of such combiner 100, and may be operable to transfer electrical signals into and/or out from such a combiner 100, e.g., as a coaxial transmission line. A combiner 100 may be designed and/or constructed into, for example within and/or as part of, a housing 150. Such a housing 150 may, for example, be constructed of an electrically conductive material, e.g., aluminum. Such housing 150 may have an isolation wall 155, that may be located between two waveguide combiners/junctions 120,122. Other isolation walls 155 and/or other mechanical and/or electrical structures are possible.

Figure 2:
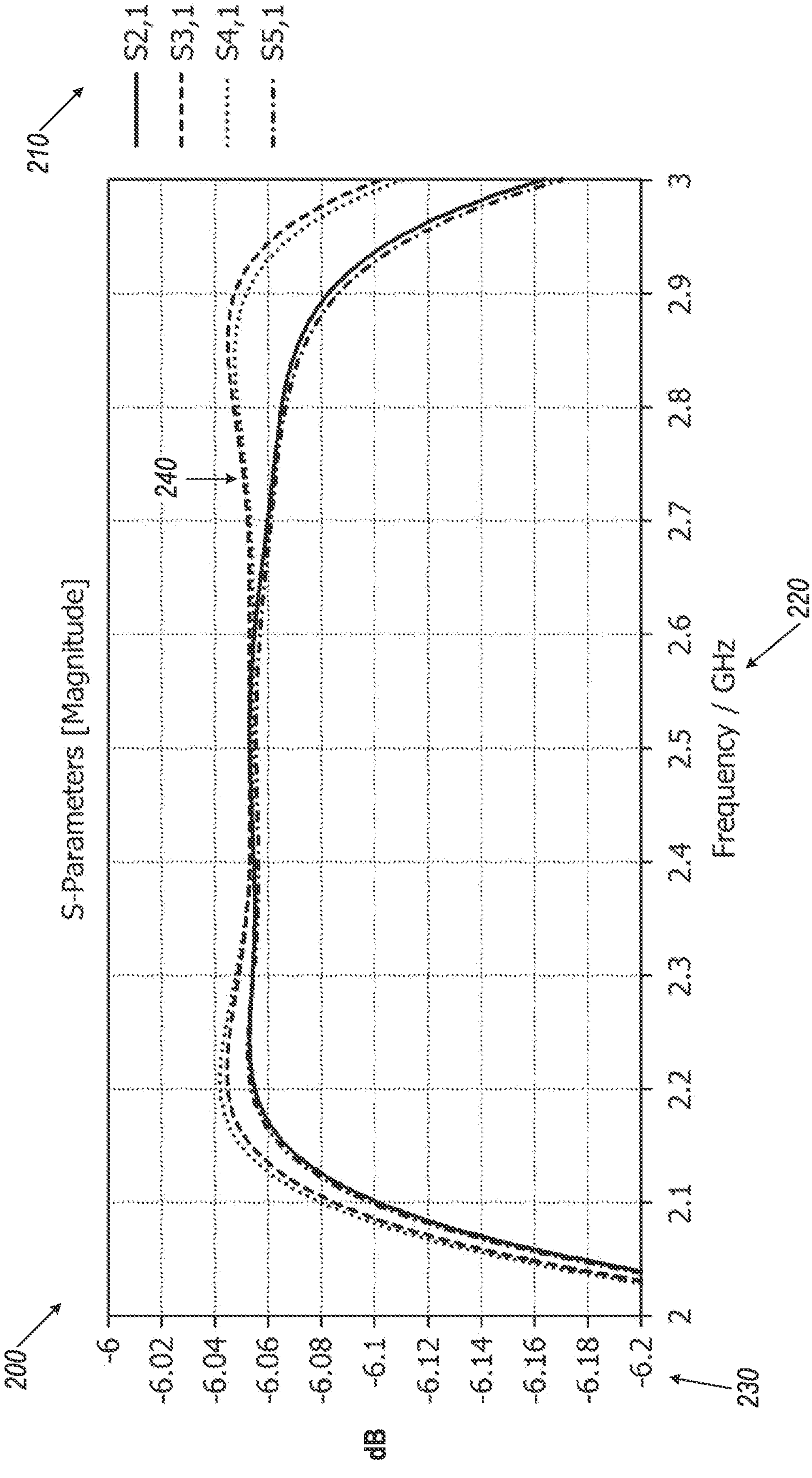
FIG. 2 depicts an exemplary diagram according to embodiments of the invention.

Embodiments of the invention may be understood with reference to FIG. 2. Typical electrical performance data 200 of a combiner according to embodiments of the invention may be depicted, such performance may be, for example, from a model analysis and/or other design, and amplitude and amplitude balance performance versus frequency 240 may be plotted. Frequency 220 may be shown, for example, over an operating bandwidth and/or over a larger than an operating bandwidth. Amplitude may be depicted according to a scale 230 in decibels (dB). Such a scale 230 may be, for example, as dB below an input RF power. For an exemplary power divider that may divide an RF signal into four relatively equal outputs, each output may be ideally 6 dB below an input Rf signal power, and may, for example, be more than 6 dB below such input power when including, for example, insertion loss of an actual combiner/divider. Such a combiner/divider may be a reciprocal device, for example where an amplitude response versus frequency 240 may be characterized by scattering parameters (S-parameters) 210, and such S-parameters 210 may be measured and/or characterized in a forward direction, e.g., S21, or in a reverse direction, e.g., S12, where each of such forward and reverse responses may be equivalent, e.g., according to such a combiner/divider being a reciprocal apparatus and/or device. An amplitude balance 240 may be depicted and may show a good correlation among all output ports of such a device. An amplitude balance and amplitude performance may be very good, e.g., close to ideal conditions, over an operating frequency range, e.g., bandwidth, for example from 2.4 GHz to 2.6 GHz, from 2.2 GHz to 2.8 GHz, or other such frequency ranges.

Figure 3:
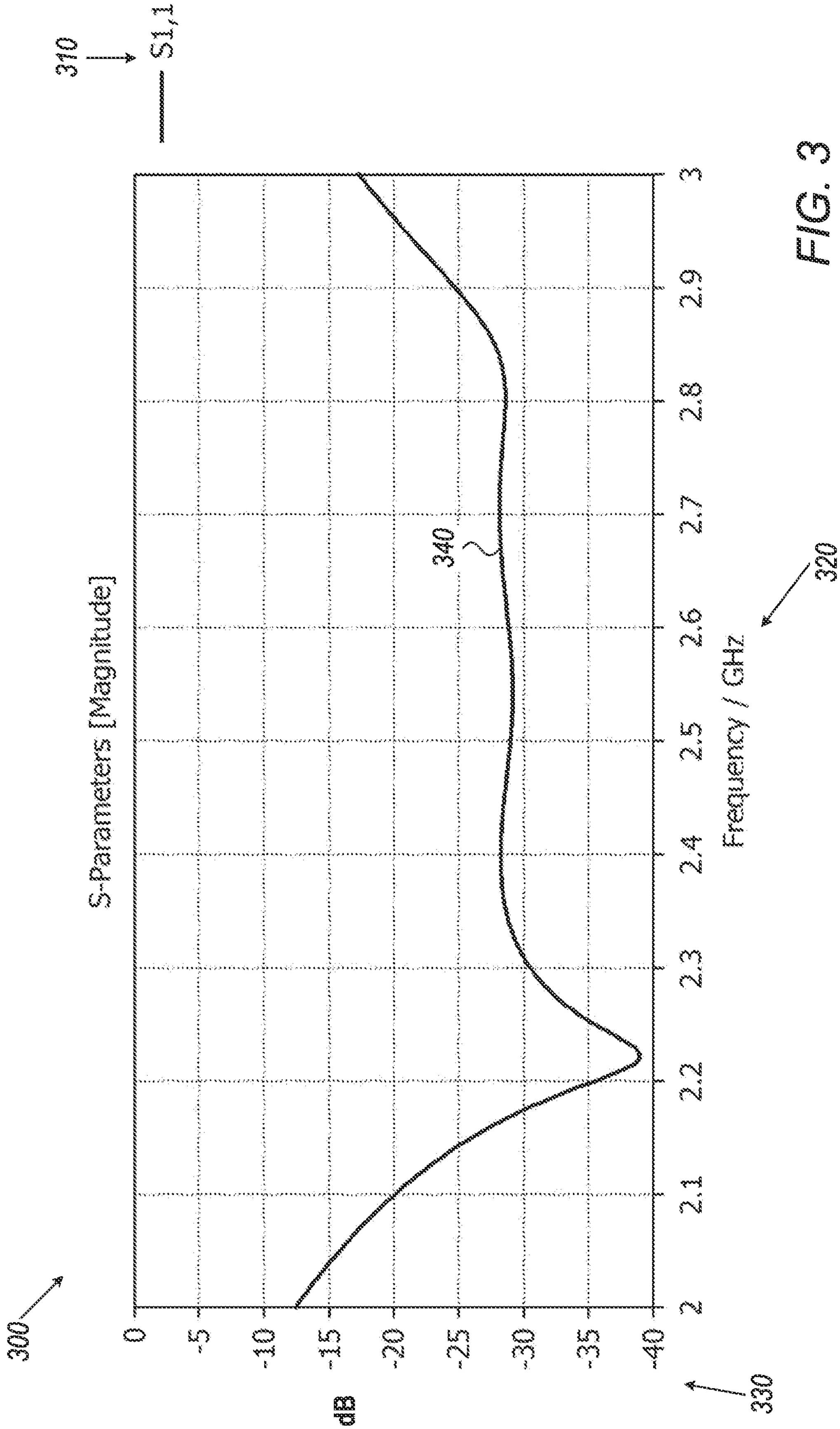
FIG. 3 depicts an exemplary diagram according to embodiments of the invention.

Embodiments of the invention may be understood with reference to FIG. 3. Typical electrical performance data 300 of a combiner according to embodiments of the invention may be depicted, and such performance may be, for example, from a model analysis and/or other design. Frequency 320 may be shown, for example, over an operating bandwidth and/or over a larger than an operating bandwidth. An output of a combiner may have electrical RF signal output return loss performance 340 that may be depicted as dB below an input reference 330 versus frequency 320. An S-parameter 310 that may indicate reflection, e.g., S11, may be shown. Output return loss performance 300. An output return loss performance may be very good, e.g., close to ideal conditions, over an operating frequency range, e.g., bandwidth, for example from 2.4 GHz to 2.6 GHz, from 2.2 GHz to 2.8 GHz, or other such frequency ranges.

Figure 4:
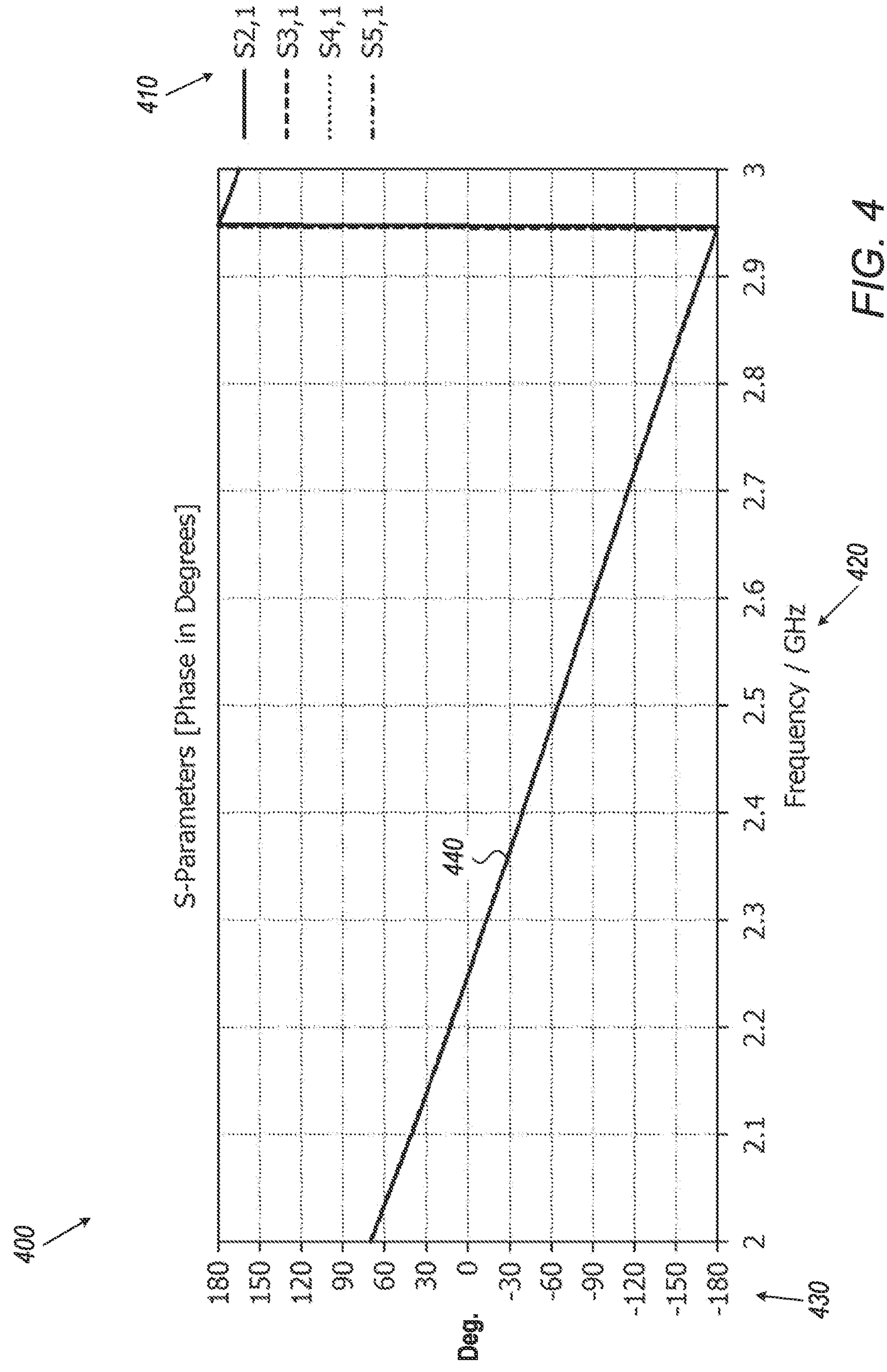
FIG. 4 depicts an exemplary diagram according to embodiments of the invention.

Embodiments of the invention may be understood with reference to FIG. 4. Typical electrical performance data 400 of a combiner according to embodiments of the invention may be depicted, and such performance may be, for example, from a model analysis and/or other design, and phase and phase balance performance versus frequency 440 may be plotted. Frequency 420 may be shown, for example, over an operating bandwidth and/or over a larger than an operating bandwidth. Phase may be depicted according to a scale 430 in degrees. For an exemplary power divider that may divide an RF signal into four relatively equal outputs, each output may have ideally a same output phase. Such a combiner/divider may be a reciprocal device, for example where a phase response versus frequency 440 may be characterized by scattering parameters (S-parameters) 410, and such S-parameters 410 may be measured and/or characterized in a forward direction, e.g., S21, or in a reverse direction, e.g., S12, where each of such forward and reverse responses may be equivalent, e.g., according to such a combiner/divider being a reciprocal apparatus and/or device. A phase balance 440 may be depicted and may show a good correlation, e.g., equivalency, among all output ports of such a device. A phase balance and phase performance may be very good, e.g., close to ideal conditions, over an operating frequency range, e.g., bandwidth, for example from 2.4 GHz to 2.6 GHz, from 2.2 GHz to 2.8 GHz, or other such frequency ranges.

Figure 5:
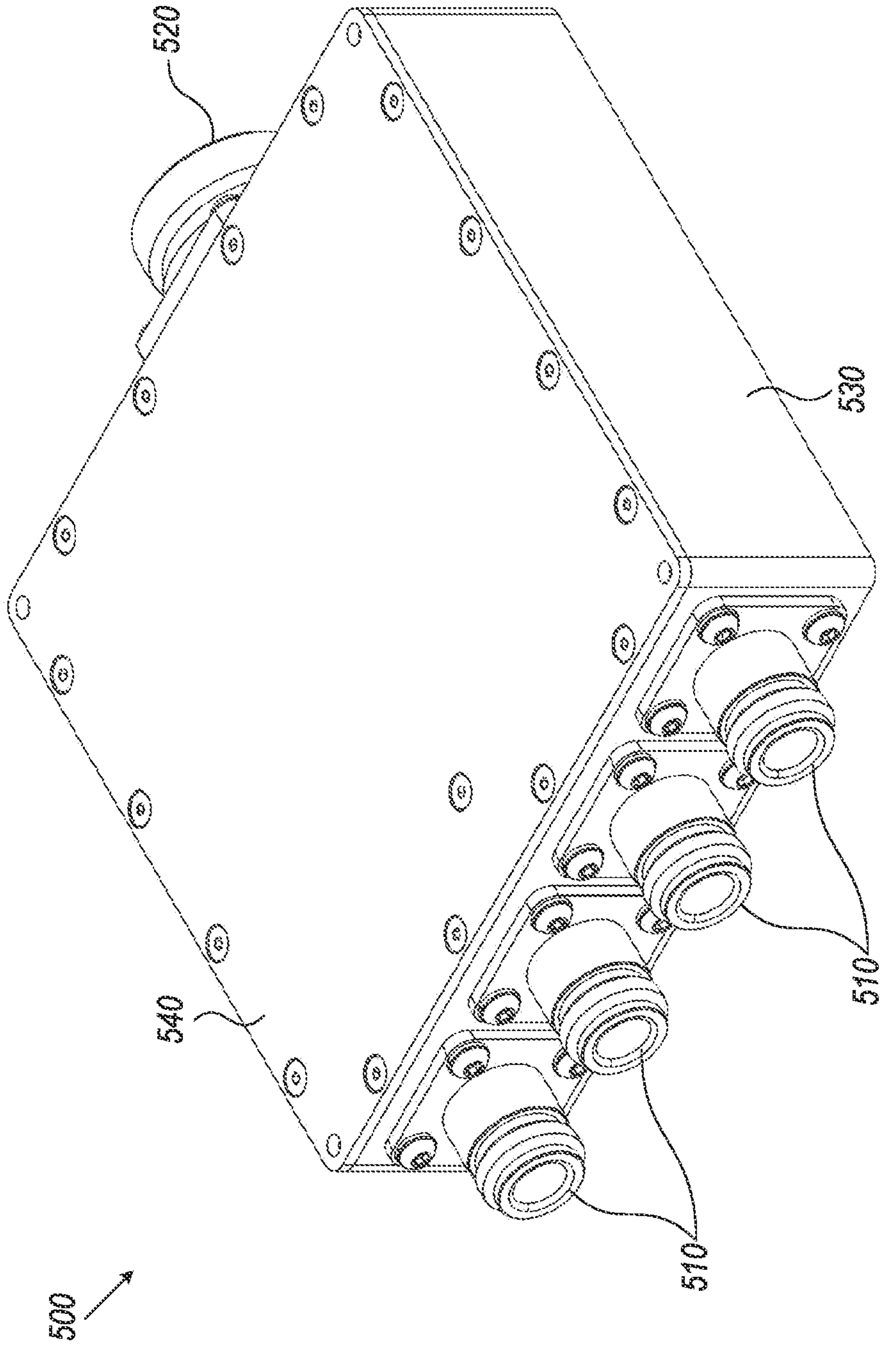
FIG. 5 depicts an exemplary diagram according to embodiments of the invention.

Embodiments of the invention may be understood with reference to FIG. 5. A combiner 500 according to embodiments of the invention may be depicted. A combiner 500 may be shown with a top cover 540 affixed in place. An exemplary configuration of combiner 500 may have inputs 510, e.g., four inputs, on one side and an output 520 on an opposite side. Inputs 510 and output 520 may be via connectors, for example coaxial connectors, e.g., N-Type connectors, and such connectors may be mechanically and/or electrically attached to housing 530. Cover 540 may be held in place by fasteners, e.g., screws, and when affixed, cover 540 together with housing 530 may form an electrical envelope of a combiner 500.

Figure 6:
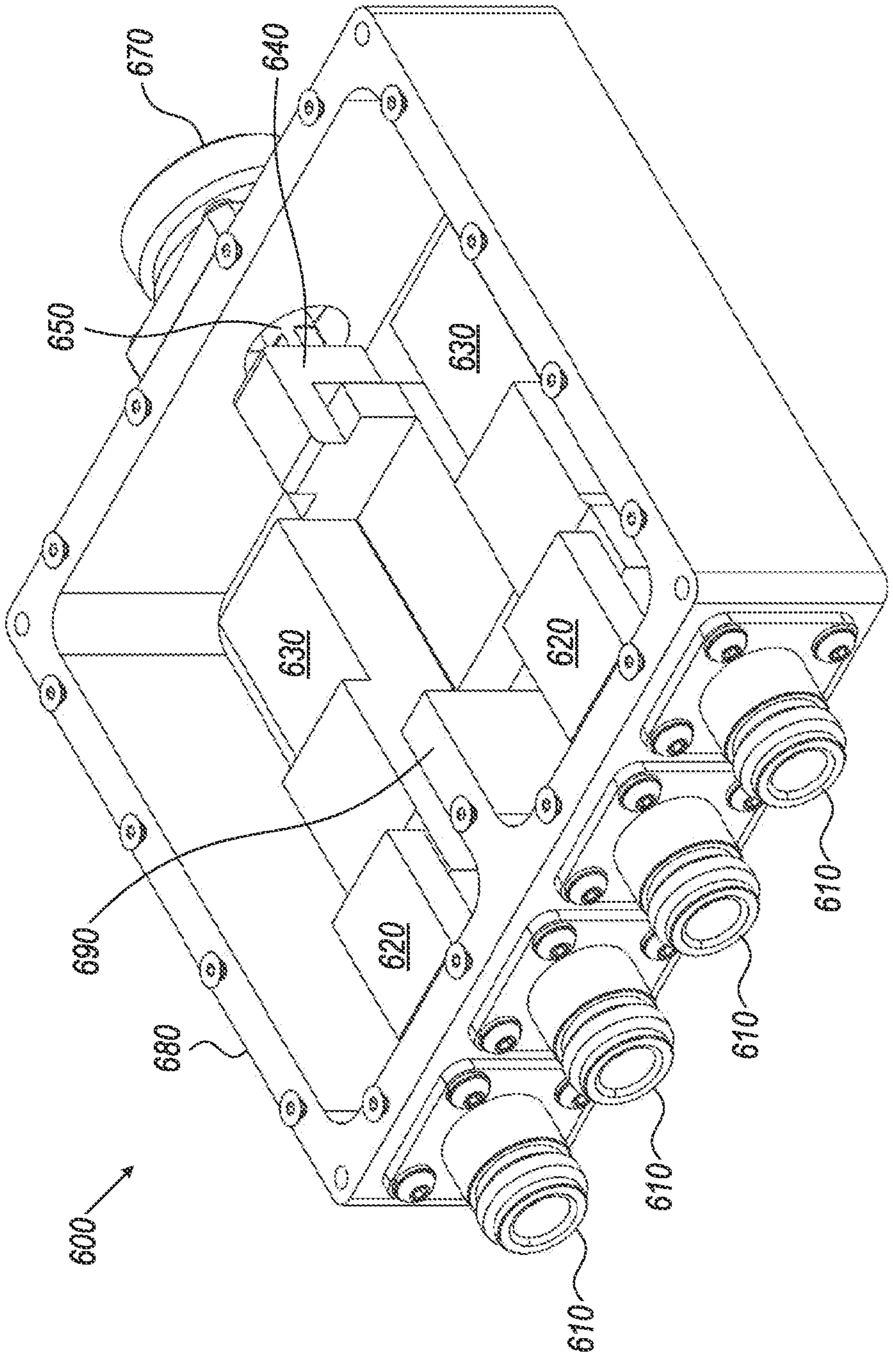
FIG. 6 depicts an exemplary diagram according to embodiments of the invention.

Embodiments of the invention may be understood with reference to FIG. 6. A combiner 600 according to embodiments of the invention may be depicted. A combiner 600 may be shown with a top cover removed, for example, for illustrative purposes. Combiner 600 may be depicted, for example, by a rotated view. Inputs 610 may be coaxial connectors, or the like, where such coaxial center conductor may be attached to a coaxial to waveguide transition, and such transition may be operable to carry electrical signals. A waveguide transition may be connected to a waveguide combiner 620, and such a waveguide combiner 620 may be operable as an impedance transformer. Such combiner 620 may be operable to combine, e.g., power combine, two electrical signals, for example, two electrical signals that may have been input from a waveguide transition, and such combined electrical signal, e.g., having the sum of a power of each of the input electrical signals, may be output to a waveguide. Such waveguide carrying an output of combiner 620 may be, for example, a single ridged waveguide that may be located between two single ridged waveguide 630. Such single ridged waveguide may carry an electrical signal from combiner 620 to a waveguide combiner, and such waveguide combiner may be for example, a single ridged waveguide combiner 620. Such a single ridged waveguide combiner may be operable together with two single ridged waveguide 630 to combine, e.g., power combine, for example, two electrical signals that may have been input from waveguide transition single ridged waveguide 630, and such combined electrical signal, e.g., having the sum of a power of each of the input electrical signals, may be output to a waveguide mechanical stress relief 640, and then to waveguide to coaxial transformer 650. A single ridged waveguide combiner may be attached to a waveguide to coaxial transformer 650 by, for example, a waveguide mechanical stress relief and attachment 640. Such waveguide to coaxial transformer 650 may be a transition, and may be attached to a coaxial transmission line, and such transition may be operable to carry electrical signals. Such waveguide to coaxial transformer 650 may have a center conductor, e.g., a coaxial center conductor, extending from an interior of such combiner 600, and may connect to an output 670. Such output 670 may be a coaxial connector. Such conductor may be insulated from a surrounding housing of such combiner 600, and may be operable to transfer electrical signals into and/or out from such a combiner 600, e.g., as a coaxial transmission line. A combiner 600 may be designed and/or constructed into, for example within and/or as part of, a housing 680. Such a housing 680 may, for example, be constructed of an electrically conductive material, e.g., aluminum. Such housing 680 may have an isolation wall 690, that may be located between two waveguide combiners 620. Other isolation walls 690 and/or other mechanical and/or electrical structures are possible. Inputs 610. Waveguide impedance transformer 620. Single ridged waveguide 630. A waveguide to coaxial transition and mechanical stress relief 640 may be attached to a waveguide combiner and impedance transformer that may combine electrical signals from two single ridged waveguides 630 at a distal end from a coaxial output 670. A waveguide to coaxial transition and mechanical stress relief 640 may be attached to a coaxial transformer 650 at a proximal end near a coaxial output 670. Such waveguide to coaxial transition and mechanical stress relief 640 may have a structural and/or electrical member parallel, but not coaxial, to a coaxial transformer 650, thus forming an “L” shape, a “U” shape, or other like shapes. A gap between such connections may facilitate, for example, thermal expansion and/or compression. When combining RF signals, a combiner 600 may have a maximum total power transiting through waveguide to coaxial transition and mechanical stress relief 640 and attached elements, thus making it important for thermal consideration handling.

Figure 7:
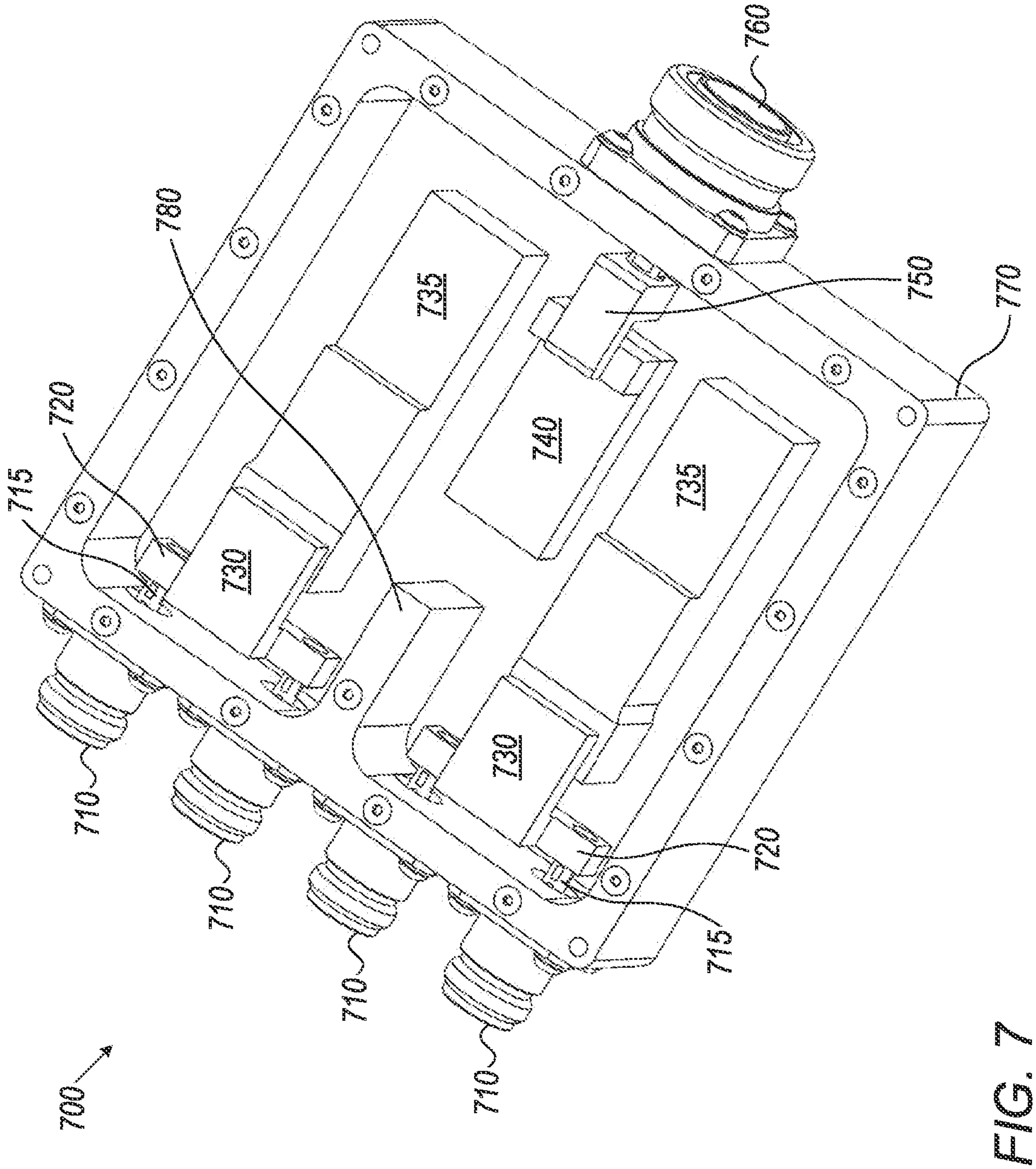
FIG. 7 depicts an exemplary diagram according to embodiments of the invention.

Embodiments of the invention may be understood with reference to FIG. 7. A combiner according to embodiments of the invention may be depicted. A combiner 700 may be shown with a top cover removed, for example, for illustrative purposes. Inputs 710 may be coaxial connectors, or the like, where such coaxial center conductor 715 may be attached to a coaxial to waveguide transition 720, and such transition may be operable to carry electrical signals. A coaxial center conductor 715 may be attached to a coaxial to waveguide transition and impedance transformer 720, and such transition may be operable to carry electrical signals. Such a coaxial center conductor 715 may be, for example, an input to an interior, e.g., a cavity, of a housing 770. A waveguide transition 720 may be connected to a waveguide combiner 730, e.g., a waveguide 2:1 combiner, and such a waveguide combiner 730 may be operable as an impedance transformer. Such combiner 730 may be operable to combine, e.g., power combine, two electrical signals, for example, two electrical signals that may have been input from waveguide transition 720, and such combined electrical signal, e.g., having the sum of a power of each of the input electrical signals, may be output to a waveguide. Such waveguide carrying an output of combiner 730 may be, for example, a single ridged waveguide 735. Such single ridged waveguide 735 may carry an electrical signal from combiner 730 to waveguide combiner 740, and such waveguide combiner 740 may be for example, a single ridged waveguide combiner 740. Such a single ridged waveguide combiner 740 may be operable together with two single ridged waveguide 735 to combine, e.g., power combine, for example, two electrical signals that may have been input from waveguide transition single ridged waveguide 735, and such combined electrical signal, e.g., having the sum of a power of each of the input electrical signals, may be output to a waveguide mechanical stress relief 750, and then to waveguide to coaxial transformer. A single ridged waveguide combiner 740 may be attached to a waveguide to coaxial transformer by, for example, a waveguide mechanical stress relief and attachment 750. Such waveguide to coaxial transformer may be a transition, and may be attached to a coaxial transmission line, and such transition may be operable to carry electrical signals. Such waveguide to coaxial transformer may have a center conductor, e.g., a coaxial center conductor, extending from an interior of such combiner 700, and may connect to an output 760. Such conductor may be insulated from a surrounding housing 770 of such combiner 700, and may be operable to transfer electrical signals into and/or out from such a combiner 700, e.g., as a coaxial transmission line. A combiner 700 may be designed and/or constructed into, for example, within and/or as part of, a housing 770. Such a housing 770 may, for example, be constructed of an electrically conductive material, e.g., aluminum. Such housing 770 may have an isolation wall 780, that may be located between two waveguide combiners 730. Other isolation walls 780 and/or other mechanical and/or electrical structures are possible.

Figure 8:
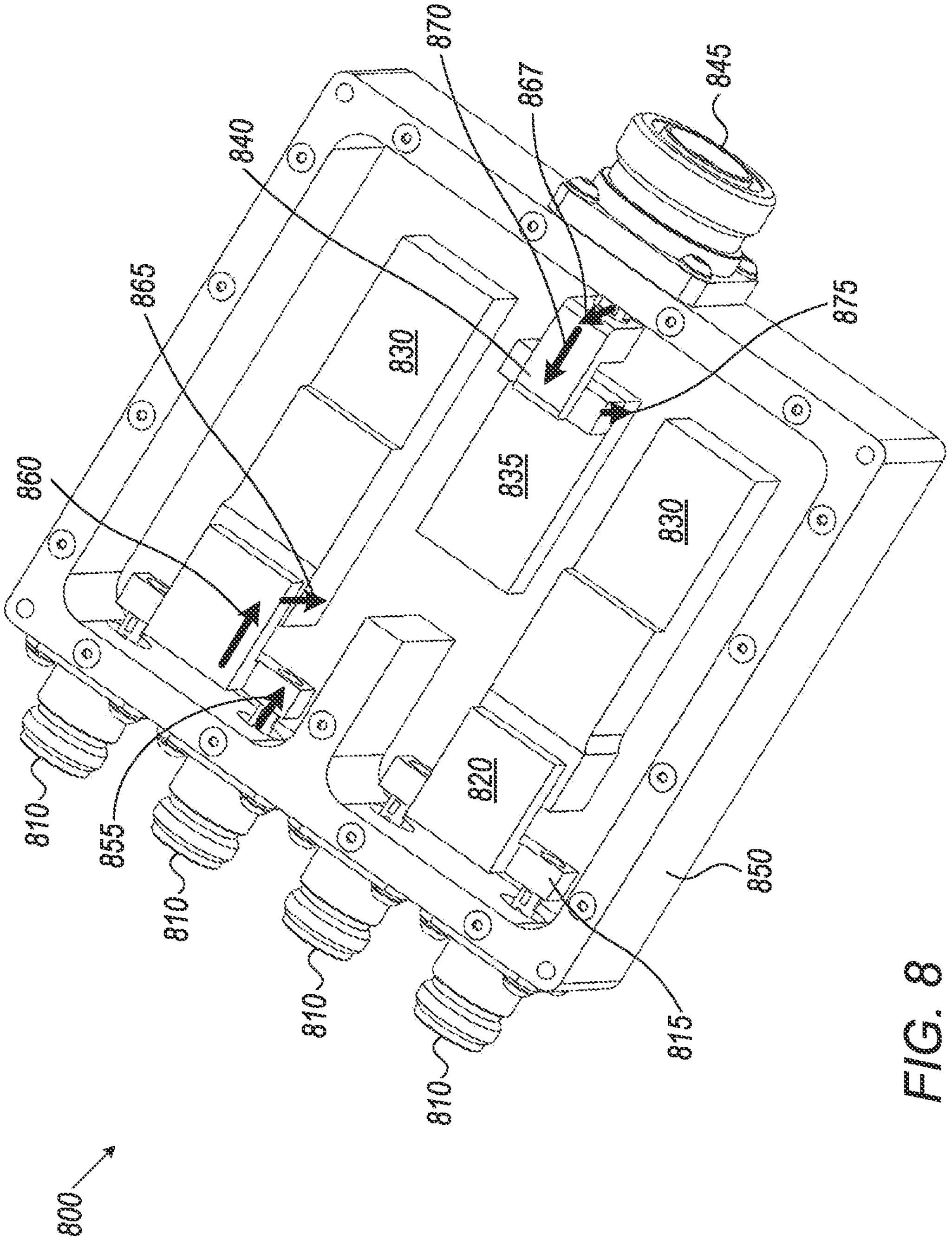
FIG. 8 depicts an exemplary diagram according to embodiments of the invention.

Embodiments of the invention may be understood with reference to FIG. 8. A combiner 800 according to embodiments of the invention may be depicted. A combiner 800 may be shown with a top cover removed, for example, for illustrative purposes. Arrows may depict a thermal dissipation path, e.g., a flow of heat produced by operation and dissipated along such paths. An RF signal may be input 810 to a combiner 800 and propagate via coaxial input to coaxial to waveguide transition 815, sending such RF signal into a waveguide transmission medium. Waveguide transition 815 may connect to waveguide 2:1 combiner 820, operable to combine two RF signals from waveguide transitions 815. Waveguide 2:1 combiner 820 connects to single ridged waveguide 830 allowing RF signals to propagate via such single ridged waveguide 830. A lower edge of single ridged waveguide 830 may be attached to a floor of housing 850, or may be formed from a same material as housing 850, thus providing a thermal path to such housing 850 that may increase heat dissipation. Two single ridged waveguide 830 may be electrically connected to single ridge waveguide combiner 835, for example, by one or more waveguide electrical transmission modes. Single ridge waveguide combiner 835 may be attached to waveguide to coaxial transformer and mechanical stress relief 840, and thus may allow a combined power of an RF signal from single ridge waveguide combiner 835 to propagate into a coaxial transmission line and/or mode. Waveguide to coaxial transition, e.g., transformer, and mechanical stress relief 840 may be attached to a coaxial transmission line, and such coaxial transmission line may be connected to output 845, thus allowing such combined RF signal to be available at output 845. Combiner 800 may be depicted with heat flow paths shown for illustrative purposes, where heat may be generated from small losses of an RF signal that may be, for example, at a high RF power, as such RF signal transits through such electrical signal transmission elements that may be internal to such combiner 800, as described herein. Design and/or construction of such elements in consideration of such heat generated and associated thermal paths for dissipation of such heat may be unique features of embodiments of the invention. Such heat dissipation considerations may allow for a significant simplification of design and/or construction of RF signal power combiner 800. Thermal path 855 may thermal flow from coaxial to waveguide transition 815. Thermal path 860 may be along waveguide 2:1 combiner 820, and such waveguide may be, for example a suspended waveguide, e.g., may not be directly attached to a surface of housing 850. Thermal path 865 may be a from waveguide 2:1 combiner 820 to housing 850. Thermal path 867 from a coaxial output to waveguide stress relief 840. Thermal path 870 may be in and/or along waveguide to coaxial transition and mechanical stress relief 840. Thermal path 875 may be from waveguide 840 to housing 850.

Figure 9:
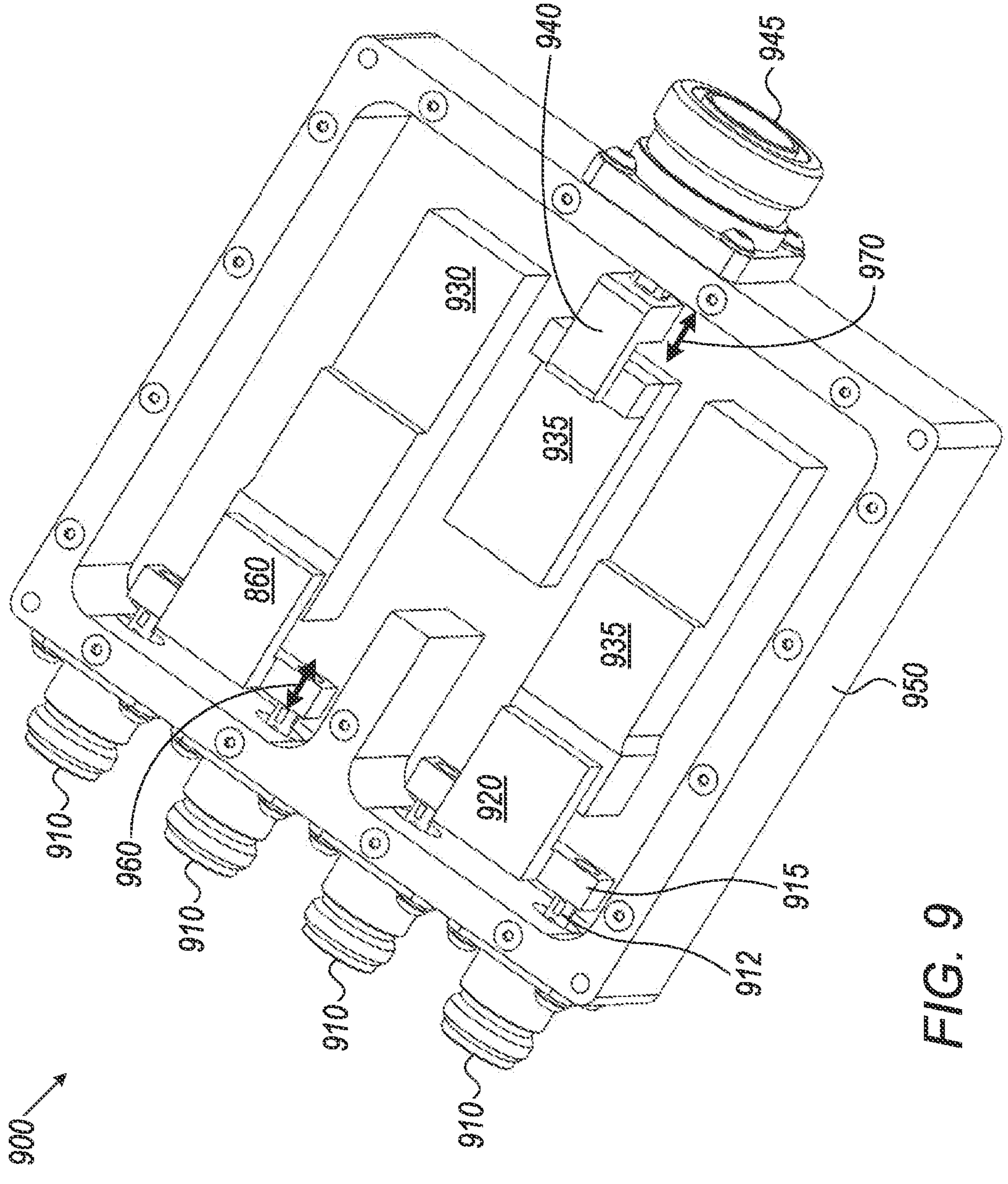
FIG. 9 depicts an exemplary diagram according to embodiments of the invention.

Embodiments of the invention may be understood with reference to FIG. 9. A combiner 900 according to embodiments of the invention may be depicted. A combiner 900 may be shown with a top cover removed, for example, for illustrative purposes. An RF signal may be input 910 to a combiner 900 and propagate via coaxial input 912. Coaxial input 912 may connect to coaxial to waveguide transition 915, sending such RF signal into a waveguide transmission medium. Coaxial to waveguide transition 915 may connect to waveguide 2:1 combiner 920, operable to combine two RF signals from waveguide transitions 915. Waveguide 2:1 combiner 920 connects to single ridged waveguide 930 allowing RF signals to propagate via such single ridged waveguide 930. A lower edge of single ridged waveguide 930 may be attached to a floor of housing 950, or may be formed from a same material as housing 950. Two single ridged waveguide 930 may be electrically connected to single ridge waveguide combiner 935, for example, by one or more waveguide electrical transmission modes. Single ridge waveguide combiner 935 may be attached to waveguide to coaxial transformer and mechanical stress relief 940, and thus may allow a combined power of an RF signal from single ridge waveguide combiner 935 to propagate into a coaxial transmission line and/or mode. Waveguide to coaxial transition/transformer and mechanical stress relief 940 may be attached to a coaxial transmission line, and such coaxial transmission line may be connected to output 945, thus allowing such combined RF signal to be available at output 945. Arrows 960, 970 may depict locations and/or directions of mechanical stress and relief of such mechanical stress, e.g., along a path and/or direction depicted. A design and/or construction of combiner 900 may include one or more ways to release mechanical stress, for example, due to a mismatch of coefficients of temperature expansion (CTE) that may be from thermal generation from propagating high power RF signals, and may be depicted on combiner 900 by FIG. 9. Mechanical stress 960 may be relieved by coaxial to waveguide transition 915, as coaxial to waveguide transition 915 may include a feature to absorb thermal expansion of, for example, an insulative material, e.g., PTFE, of coaxial transmission line 912. Mechanical stress 970 may be relieved by waveguide to coaxial transition and mechanical stress relief 940, where such waveguide to coaxial transition and mechanical stress relief 940 may flex along a direction 970 as indicated.

Figure 10:
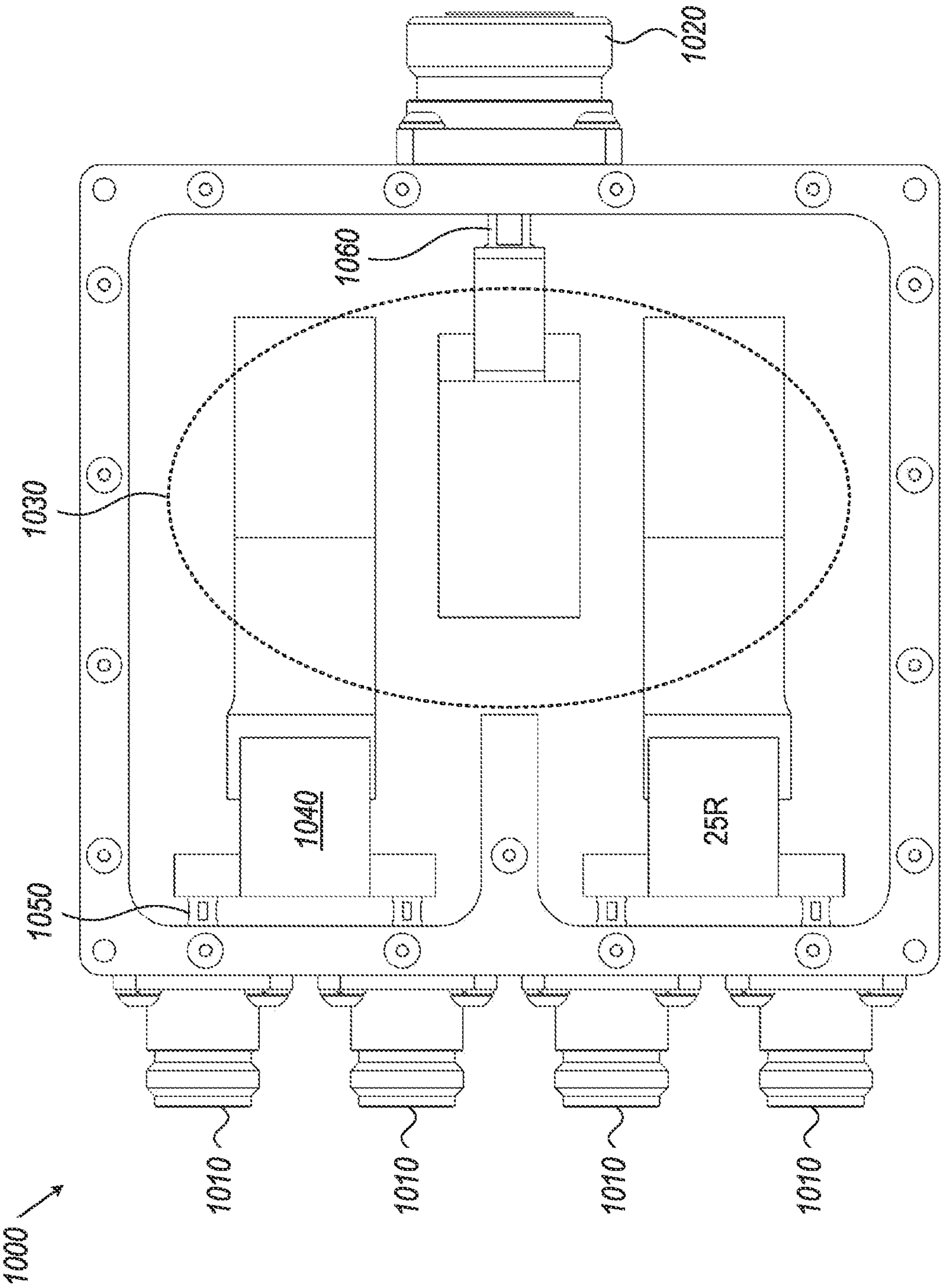
FIG. 10 depicts an exemplary diagram according to embodiments of the invention.

Embodiments of the invention may be understood with reference to FIG. 10. A combiner 1000 according to embodiments of the invention may be depicted. A combiner 1000 may be shown with a top cover removed, for example, for illustrative purposes. Internal impedances and/or impedance combinations may be depicted. An RF signal may be input to combiner 1000 at input 1010. Such RF signal may enter an interior of combiner 1000 via a coaxial transmission line, for example, as an extension of an input 1010 connector, then may travel through coaxial to waveguide transition 1050. Two RF signals each from a coaxial to waveguide transition 1050 may be combined in single ridged 2:1 combiner 1040. An input impedance at input 1010 may be, for example, 50 ohms. Coaxial to waveguide transition 1050 may be, or behave electrically as, for example, a 50 ohms impedance transmission line. Single ridged 2:1 combiner 1040 may be operable to take two 50 ohms input impedances and combine them, for example, in parallel, to form a 25 ohms output. Two outputs each from a single ridged 2:1 combiner 1040 may enter a single ridged combiner 2:1 1030, and such single ridged 2:1 combiner 1040 may combine, e.g., power combine, both input signals into a combined output signal. Such single ridged 2:1 combiner 1040 output signal may be input to waveguide to coaxial transition 1060, and then such signal travels through output 1020. Each input impedance to single ridged 2:1 combiner 1040 may, for example, be 25 ohms, and such single ridged 2:1 combiner 1040 may be operable to take two 25 ohms impedances and combine them, for example, in series, to form a 50 ohms output. Such 50 ohms output may match an impedance of waveguide to coaxial impedance that may be 50 ohms, and provide a 50 ohms impedance at output 1020. Such a combiner 1000 configuration may have both 50 ohms input 1010 impedances and 50 ohms output 1020 impedances. Internally, such a combiner 1000 may transform from 50 ohms input impedance to 25 ohms propagation impedance, and back to a 50 ohms output impedance, and such propagation may be via, for example, a single ridged waveguide.

Figure 11:
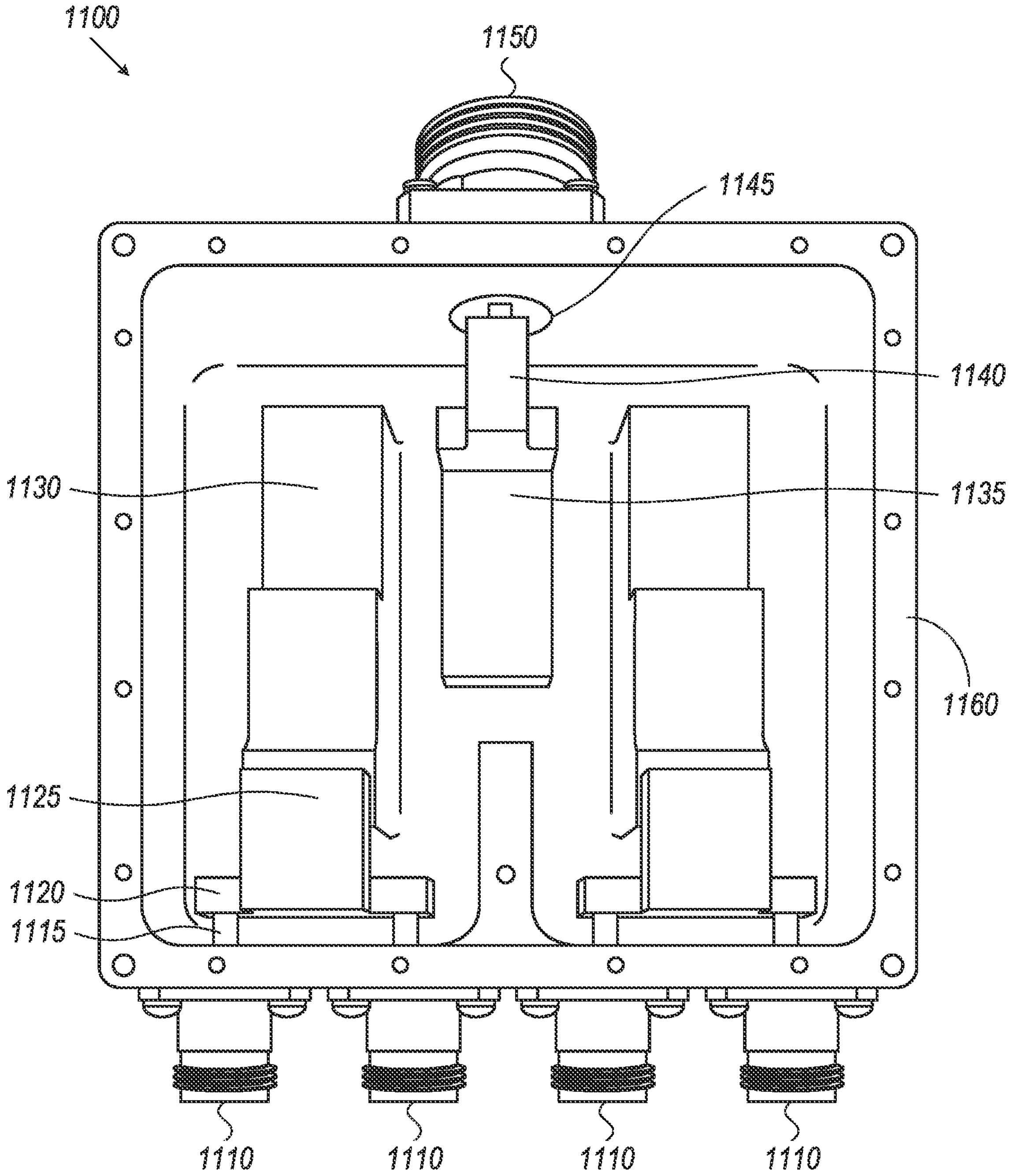
FIG. 11 depicts an exemplary diagram according to embodiments of the invention.

Embodiments of the invention may be understood with reference to FIG. 11. A combiner 1100 according to embodiments of the invention may be depicted. A combiner 1100 may be shown with a top cover removed, for example, for illustrative purposes. A combiner 1100 may be, for example, a non-isolating architecture and such architecture may be sufficient, for example when each power amplifier (PA) may be protected by a protection device, e.g., circulator, where isolating may refer to an RF signal isolation among inputs 1110. Such a combiner 1100 may perform effectively and may be smaller, e.g., two times smaller, and/or may be lighter, e.g., lighter weight, mass, etc. A number of parts to produce such a combiner 1100 may be small, reducing a total cost of manufacture of such combiner 1100. An assembly process may be simplified and may be achieved without substantial use of chemicals, for example a use of solder and/or associated flux may be reduced or eliminated. Once constructed according to a design according to embodiments of the invention minimal and/or no additional tuning and/or electrical adjustment may be required. An RF signal my be input 1110 to a combiner 1100 and propagate via coaxial input 1115. Coaxial input 1115 may connect to coaxial to waveguide transition 1120, sending such RF signal into a waveguide transmission medium. Waveguide transition 1120 may connect to waveguide 2:1 combiner 1125, operable to combine two RF signals from waveguide transitions 1120. Waveguide 2:1 combiner 1125 connects to single ridged waveguide 1130 allowing RF signals to propagate via such single ridged waveguide 1130. A lower edge of single ridged waveguide 1130 may be attached to a floor of housing 1160, or may be formed from a same material as housing 1160, thus providing a thermal path to such housing 1160 that may increase heat dissipation. Two single ridged waveguide 1130 may be electrically connected to single ridge combiner 1135, for example, by one or more waveguide electrical transmission modes. Single ridge combiner 1135 may be attached to waveguide to coaxial transformer and mechanical stress relief 1140, and thus may allow a combined power of an RF signal from single ridge combiner 1135 to propagate into a coaxial transmission line and/or mode. Waveguide to coaxial transformer and mechanical stress relief 1140 may be attached to a coaxial transmission line 1145, and such coaxial transmission line 1145 may be connected to output 1150, thus allowing such combined RF signal to be available at output 1150. Such waveguide elements may be separately manufactured and then assembled and attached into housing 1160, or such waveguide elements may be manufactured from a same material as housing 1160.

Figure 12:
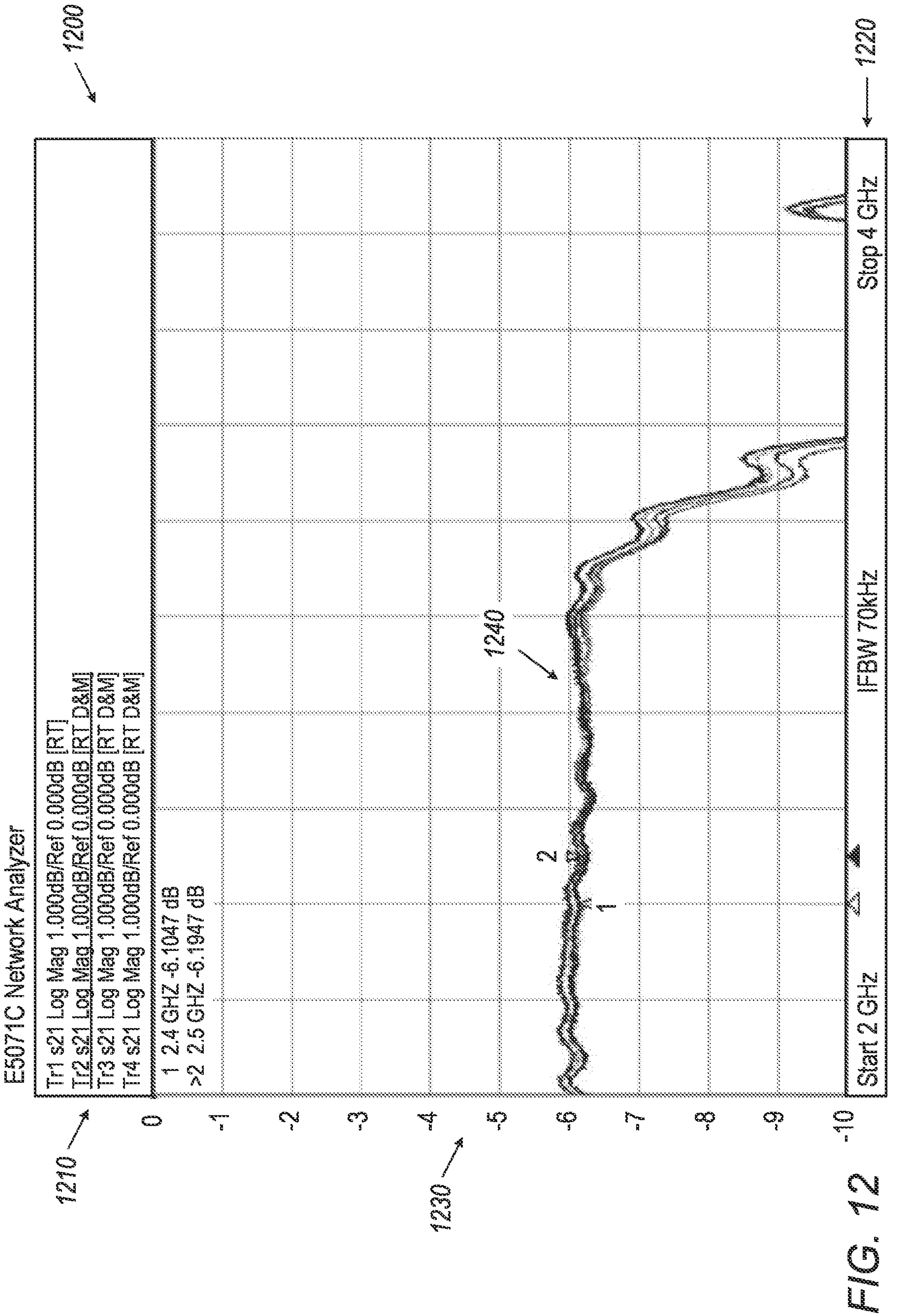
FIG. 12 depicts an exemplary diagram according to embodiments of the invention.

Embodiments of the invention may be understood with reference to FIG. 12. Typical electrical performance data 1200 of a combiner according to embodiments of the invention may be depicted, such performance may be, for example, from a test data of an actual construction of such device and/or other analysis, design, etc., and amplitude and amplitude balance performance versus frequency 1240 may be plotted. Frequency 1220 may be shown, for example, over an operating bandwidth and/or over a larger than an operating bandwidth. Amplitude may be depicted according to a scale 1230 in decibels (dB). Such a scale 1230 may be, for example, as dB below an input RF power. For an exemplary power divider that may divide an RF signal into four relatively equal outputs, each output may be ideally 6 dB below an input Rf signal power, and may, for example, be more than 6 dB below such input power when including, for example, insertion loss of an actual combiner/divider. Such a combiner/divider may be a reciprocal device, for example where an amplitude response versus frequency 1240 may be characterized by scattering parameters (S-parameters) 1210, and such S-parameters 1210 may be measured and/or characterized in a forward direction, e.g., S21, or in a reverse direction, e.g., S12, where each of such forward and reverse responses may be equivalent, e.g., according to such a combiner/divider being a reciprocal apparatus and/or device. An amplitude balance 1240 may be depicted and may show a good correlation among all output ports of such a device. An amplitude balance and amplitude performance may be very good, e.g., close to ideal conditions, over an operating frequency range, e.g., bandwidth, for example from 2.4 GHz to 2.6 GHz, from 2.2 GHz to 2.8 GHz, or other such frequency ranges. Exemplary performance may be, for example, insertion loss of 0.15 dB and/or amplitude balance of +/−0.1 dB.

Figure 13:
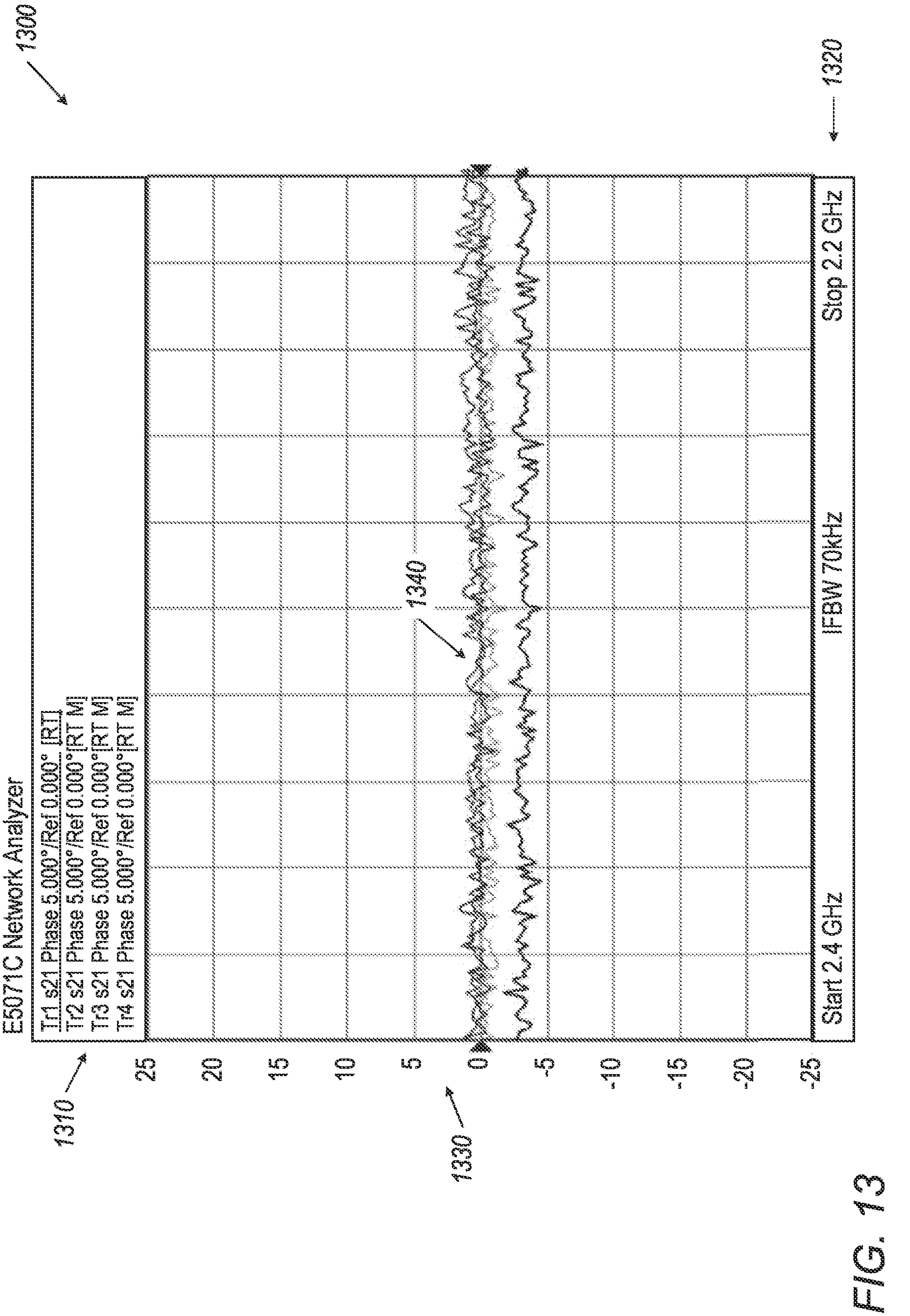
FIG. 13 depicts an exemplary diagram according to embodiments of the invention.

Embodiments of the invention may be understood with reference to FIG. 13. Typical electrical performance data 1300 of a combiner according to embodiments of the invention may be depicted, and such performance may be, for example, from a test data of an actual construction of such device and/or other analysis, design, etc., and phase and phase balance performance versus frequency 1340 may be plotted. Frequency 1320 may be shown, for example, over an operating bandwidth and/or over a larger than an operating bandwidth. Phase may be depicted according to a scale 1330 in degrees. For an exemplary power divider that may divide an RF signal into four relatively equal outputs, each output may have ideally a same output phase, or a substantially equal phase performance. Such a combiner/divider may be a reciprocal device, for example where a phase response versus frequency 1340 may be characterized by scattering parameters (S-parameters) 1310, and such S-parameters 1310 may be measured and/or characterized in a forward direction, e.g., S21, or in a reverse direction, e.g., S12, where each of such forward and reverse responses may be equivalent, e.g., according to such a combiner/divider being a reciprocal apparatus and/or device. A phase balance 1340 may be depicted and may show a good correlation, or a substantially good correlation, e.g., equivalency, among all output ports of such a device. A phase balance and phase performance may be very good, e.g., close to ideal conditions, over an operating frequency range, e.g., bandwidth, for example from 2.4 GHz to 2.5 GHz, or other such frequency ranges. Exemplary performance may be, for example, a phase balance of +/−3 deg.

Figure 14:
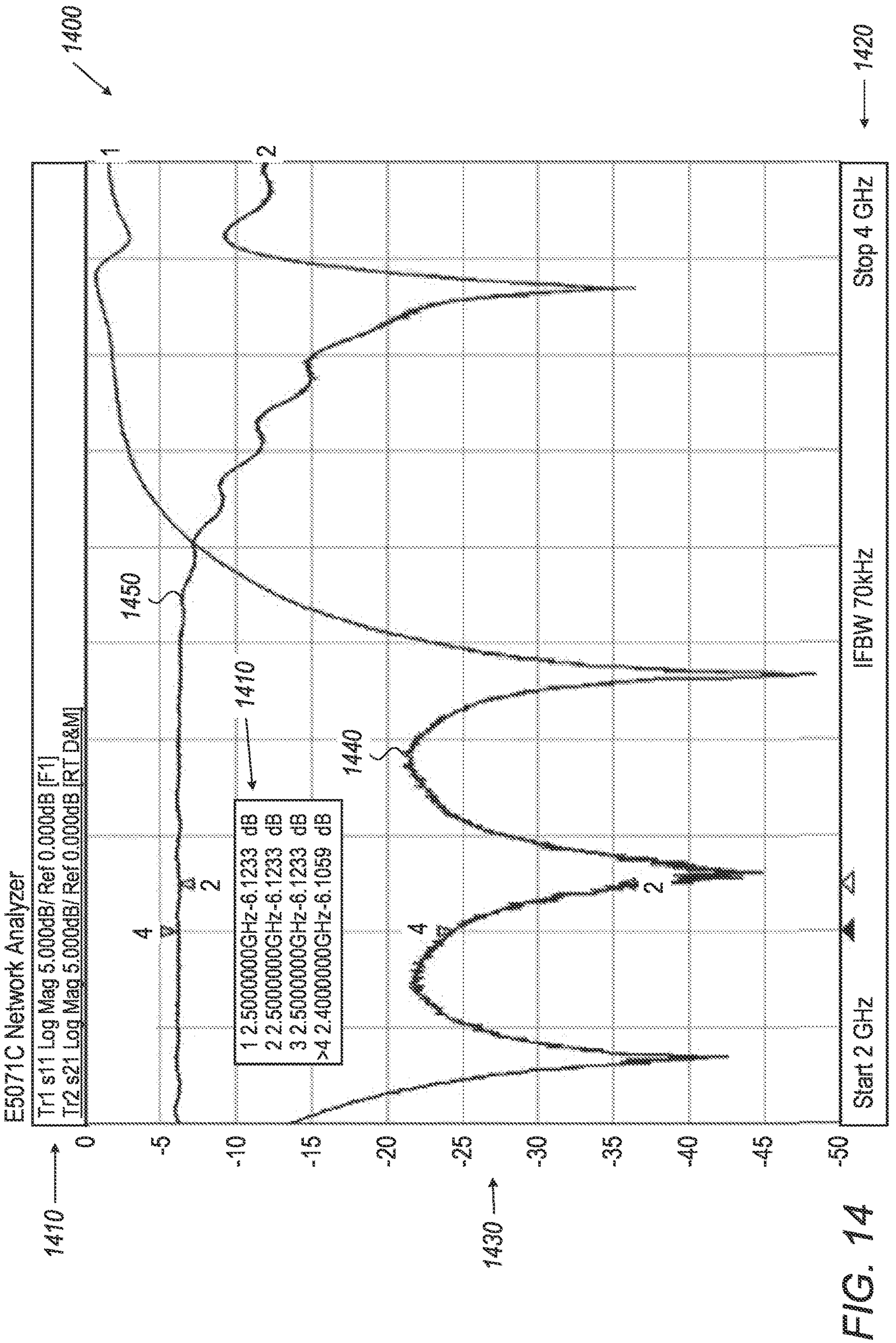
FIG. 14 depicts an exemplary diagram according to embodiments of the invention.

Embodiments of the invention may be understood with reference to FIG. 14. Typical electrical performance data 1400 of a combiner according to embodiments of the invention may be depicted, and such performance may be, for example, from a test data of an actual construction of such device and/or other analysis, design, etc. Frequency 1420 may be shown, for example, over an operating bandwidth and/or over a larger than an operating bandwidth. An output of a combiner may have electrical RF signal output return loss performance 1440 that may be depicted as dB below an input reference 1430 versus frequency 1420. An S-parameter 1410 that may indicate reflection, e.g., S11, may be shown. An output return loss performance may be very good, e.g., close to ideal conditions, over an operating frequency range, e.g., bandwidth, for example from 2.4 GHz to 2.6 GHz, from 2.2 GHz to 2.8 GHZ, 2.2 GHz to 3.0 GHz, or other such frequency ranges. Such a combiner/divider may be a reciprocal device, for example where an amplitude response versus frequency 1240 may be characterized by scattering parameters (S-parameters) 1210, and such S-parameters 1450 may be measured and/or characterized in a forward direction, e.g., S21, or in a reverse direction, e.g., S12, where each of such forward and reverse responses may be equivalent, e.g., according to such a combiner/divider being a reciprocal apparatus and/or device. An amplitude balance 1450 may be depicted and may show a good correlation among all output ports of such a device. An amplitude balance and amplitude performance may be very good, e.g., close to ideal conditions, over an operating frequency range, e.g., bandwidth, for example from 2.4 GHz to 3.0 GHz. Such performance may be good for manufacturability and/or yield, e.g., production yield. A depiction 1400 may show amplitude response versus frequency and reflection response versus frequency, for example, on a same plot.

Figure 15:
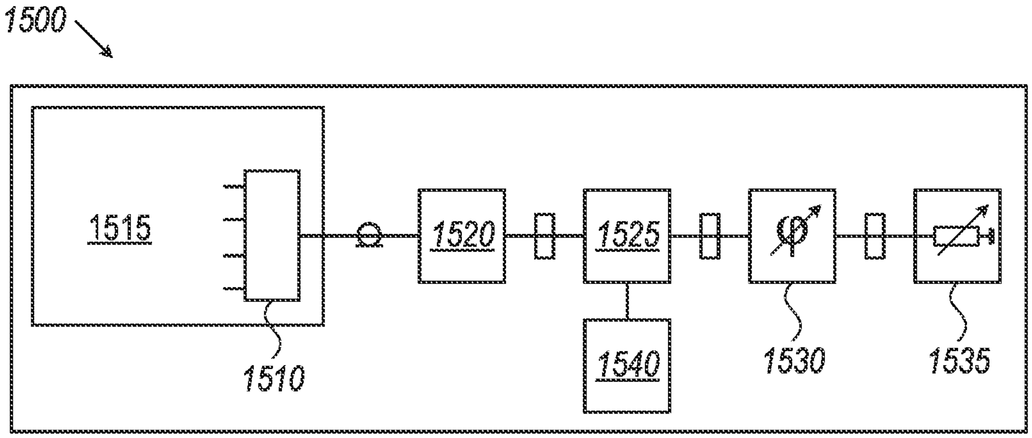
FIG. 15 depicts an exemplary diagram according to embodiments of the invention.

Embodiments of the invention may be understood with reference to FIG. 15. A test set-up configuration 1500 may be depicted, and may show equipment in an exemplary configuration that may be used to determine performance parameters of a combiner designed and/or constructed according to embodiments of the invention. A signal generator 1515, for example, an RF high power output signal generator, e.g., RFR2G42G51K0+1 KW Generator, may have a plurality of outputs, e.g., four output signals, and may drive such RF signals into a device under test, for example, a combiner 1510, e.g., an RF signal power combiner. In some embodiments a combiner 1510 output may be output in waveguide and may connect to a waveguide to coaxial transition 1520. Such coaxial output may connect to a directional coupler 1525 and then to a phase shifter 1530, e.g., a phase shifter capable of a phase shift of any phase from 0 degrees to 360 degrees, and then to one of a selection of loads 1535, for example dummy loads or a set of dummy loads, e.g., loads having voltage standing wave ratios (VSWR) of 1.05:1, 5:1, 10:1, 20:1, or other VSWR. A power meter 1540 may be connected to a coupled port output of directional coupler 1525, and may monitor a power of a combined output signal. A comparison of a monitored output power from power meter 1540 versus an input power from signal generator 1515 may provide performance of a combiner 1510.

Figure 16:
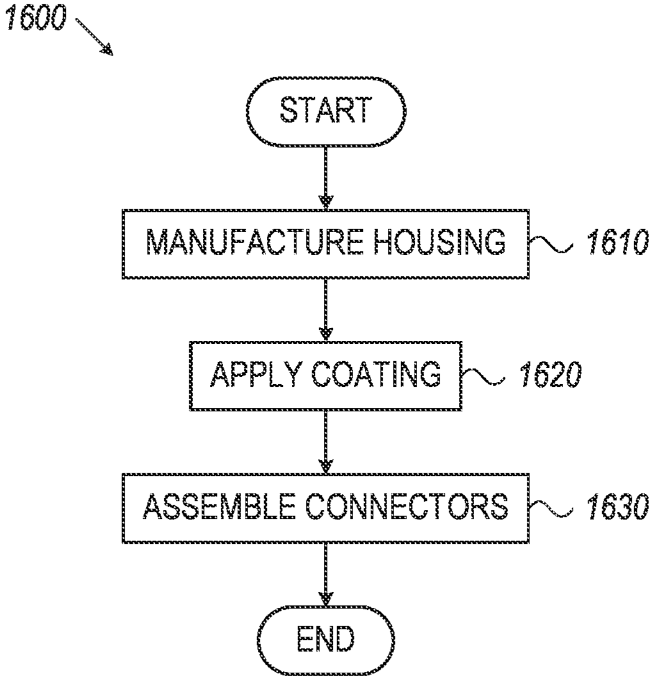
FIG. 16 depicts an exemplary diagram according to embodiments of the invention.

Embodiments of the invention may be understood with reference to FIG. 16. A method 1600 according to embodiments of the invention may be depicted. A housing of a combiner may be manufactured 1610, e.g., constructed, where such manufacturing may be according to a design of a combiner according to embodiments of the invention. Such housing manufacture may include construction of one or more waveguides, e.g., single ridged waveguides, waveguide to coaxial transitions, coaxial to waveguide transitions and/or mechanical stress relief waveguides, within such housing. A coating may be applied 1620 to a housing, for example, silver plating, e.g., to enhance conductivity, or any other suitable coating. Input connectors and output connectors may be assembled 1630 into a housing with a coating. Such a construction method and/or process 1600 of a combiner according to embodiments of the invention may be much simpler, easier and/or more cost effective than previous methods.

Exemplary performance results of testing of characteristics of a combiner designed and/or constructed according to embodiments of the invention may be determined. Such test results may be exemplary, and other performance may be understood to be additionally realized. A combiner, e.g., model No. RFR2G42G51K0+, that may be a passive device, a part of a generator, used within a generator and/or a generator, e.g., a PA, generator with an included combiner may deliver, for example, 7% more power at an output. A combiner may survive exposure to output power of, for example, 1.3 kW, and may be connected to a device having a voltage standing wave ratio (VSWR) of 1.05:1, and may be at all frequencies within an operational bandwidth of such combiner. A combiner may survive exposure to output power of, for example 400W CW, and may be connected to a device having a VSWR of 20:1, e.g., that may produce a reflection of approximately 300 W CW, and may be at any phase. A device may be connected, for example up to 5 minutes, may be up to 400 W, and may be after a generator may go into a self-protection mode, or other mode. A combiner may survive an output power (Pout) of 1000 W CW, and may be into a VSWR of 20:1, and may be, for example, for a short time before a generator may go into a self-protection mode. A combiner may survive a Pout of 1000 W pulsed into a VSWR of 20:1, e.g., having a reflection power of 750 W CW, e.g., through all phases. A test time may be 5 minutes with, for example, a pulse width of 100 us. A higher pulse width of such pulse may allow a generator to go into a self-protection mode. A duty cycle of such pulse may be any suitable value, for example a value that may be equal to or less than 50%, e.g., 10%.

Exemplary performance results of testing of characteristics of a combiner designed and/or constructed according to embodiments of the invention may be determined. Such test results may be exemplary, and other performance may be understood to be additionally realized. A combiner may operate at other power levels and/or other frequencies and/or frequency bands, e.g., 2 kW to 8 KW, 0.1 kW to 10 KW, etc., at e.g., 2.45 GHz, 915 MHz, 5.8 GHz, etc. A combiner may be designed and/or constructed to survive all such possible ruggedness and/or exposure tests. Insertion losses in a waveguide structure of a combiner may be extremely small. For example, a 1 kW generator with such a combiner may deliver, for example, 7% more power at an output. A combiner may improve system efficiency by, for example, 3.5% and may improve a cost/Watt ratio by, for example, 10%, or more. A combiner may be, for example, 2× smaller than a combiner using, for example, suspended substrate. Such a combiner may cost, for example, up to 10 times less than such other combiner. An advanced three dimensional (3D) simulation may be used to design a combiner.

Connection within a combiner may be made by electrical connection to operably maintain electrical energy signal power flow through the device. Connection material may be by any suitable conductor material, e.g., a metallic electrical conductor. Materials may be homogeneous and/or heterogeneous, where such materials may be combined, coated or plated, etc.

Embodiments of the invention may be used to design a four-way electrical signal combiner, e.g., a power combiner with four inputs and one output, providing for an input power to be combined into an output port. Other embodiments may have a plurality of input ports and an output port, having power combination occurring among two or more input ports. Power combination may be equal among input ports or may be in another proportion among input ports, such that a total power combined from all input ports, less any internal circuit losses, equals a total power emitted by an output port. An insertion loss may be a loss of energy or power experienced by an electrical power signal transitioning a device from an input port to an output port, and may represent internal circuit losses and/or transmission line losses. An insertion loss may represent electrical energy that may be converted, for example, to heat within a circuit and/or circuit elements of a circuit. An insertion loss may quantify electrical energy or power lost by components, topology, etc., of a circuit, where such energy may not be available for output by a circuit once the circuit is transitioned by such electrical signals. Electrical signals may be power signals, voltage signals, current signals, RF signals, etc.

In some embodiments an electrical impedance may be an electrical signal resistance of alternating current (AC) signals and their associated electrical signal energies transitioning an electrical conductor. Electrical impedance across a transition among electrical conductors, electrical devices, electrical circuits and/or combinations of the like, is constant when the electrical impedance of each conductor, device, circuit and/or combination is substantially the same. When an electrical impedance differs, a mismatch is created. Such a mismatch may have a characteristic of an increase in reflected electrical energy. Such a mismatch may be characterized by a reduction in electrical energy being delivered into or out of a conductor, device, circuit and/or combination. Electrical impedance may vary with varying frequencies of AC signals, and may be considered to be frequency dependent.

A power combiner may comprise an electrical signal power combiner housing, a first pair of input ports and a second pair of input ports, where each input port may connect to an input coaxial transmission line and into a power combiner housing. There may be a plurality of coaxial transmission line to waveguide transitions within a housing, where each input coaxial transmission line may connect to a coaxial input of one of each coaxial to waveguide transitions. There may be a first waveguide junction within a housing connected to each of the two waveguide transitions from a first pair of input ports, and having a waveguide output. There may be a second waveguide junction within a housing that may be connected to each of two waveguide transitions from a second pair of input ports, and having a waveguide output. There may be a first waveguide transmission line within a housing that may be connected at one end to an output of a first waveguide junction and at an other end to a third waveguide junction within a housing. There may be a second waveguide transmission line within a housing that may be connected at one end to a second waveguide junction and at an other end to a third waveguide junction. There may be a mechanical stress relief waveguide within a housing that may be connected at one end to an output of a third waveguide junction, and may be connected at an other end to a waveguide to coaxial transmission line transition within a housing. There may be an output coaxial transmission line connected at one end to a waveguide to coaxial transmission line transition, and at another end output of a housing to an output port.

A power combiner may have input ports and an output port that each may be a radio frequency (RF) connector. A power combiner may have a first waveguide transmission line and a second waveguide transmission line that may each be single ridged waveguide. A power combiner may have a plurality of coaxial transmission line to waveguide transitions and waveguide to coaxial transmission line transition may each be a current probe transition type. A power combiner may have a mechanical stress relief waveguide that may be shaped with, for example, two right angle bends that may allow expansion and/or contraction, for example, with a changing self temperature. A power combiner may have a mechanical stress relief waveguide that may form a mechanical stress relief loop. A power combiner may have coaxial transmission lines that may comprise a PTFE insulator material between a center conductor and an outer conductor. A power combiner may have a plurality of, for example four, coaxial transmission line to waveguide transitions and a waveguide to coaxial transmission line transition may have mechanical flexibility at an interface between PTFE and an outer conductor of waveguide transitions, and may allow expansion and/or contraction, for example, with a changing self temperature.

A power combiner may have a plurality of coaxial transmission line to waveguide transitions that may comprise an input 50 ohms impedance at each input, and a combined output impedance of 25 ohms. A power combiner may have a waveguide to coaxial transmission line transition that may comprise an input 25 ohms impedance at each input, and a combined output impedance of 50 ohms. A power combiner may have a first waveguide transmission line and a second waveguide transmission line each form part of a cooling structure that may provide thermal dissipation to a housing.

A power combiner may have a power combiner that may be operable to combine electrical signals input to a power combiner into a combined total power electrical signal output.

A radio frequency (RF) electrical signal power combiner may comprise, e.g., four RF input ports, where each input port may further comprises an RF connector that may be attached to an exterior of an RF electrical signal power combiner, and attached 50 ohms coaxial transmission line into an interior of an electrical signal power combiner, and, e.g., four coaxial to waveguide transitions, each electrically connected to each 50 ohms coaxial transmission line, in pairs, and two 2:1 single ridged waveguide combiners and impedance transformers, each operably combining two input RF electrical signals into a combined output power electrical signal, and operably transforming input RF electrical signals at 50 ohms impedances to an output 25 ohms impedance, and two RF waveguide transmission lines, each electrically operably connected to an output of single ridged waveguide combiners and impedance transformers, each with transmission line impedance of 25 ohms, and each mechanically attached to an interior of a housing, where a mechanical attachment may provide for thermal dissipation of heat generated by an electrical signal power combiner, and a single ridged coupled waveguide 2:1 power combiner electrically operably combining two inputs from each of two RF waveguide transmission lines, and such combining primarily by electrical coupling, and may have input impedance of 25 ohms and output impedance of 50 ohms, and a thermal stress relief half-loop and/or loop waveguide transmission line that may be connected to an output of a single ridged coupled waveguide 2:1 power combiner, and a 50 ohms coaxial transmission line connected to a thermal stress relief half-loop waveguide transmission line from an interior of an electrical signal power combiner to an exterior of an RF electrical signal power combiner, and RF output ports, where such output port further comprises an RF connector that may be attached to an exterior of said RF electrical signal power combiner, and may be attached to a 50 ohms coaxial transmission line from an interior of an electrical signal power combiner.

A method of constructing an electrical signal power combiner may comprise constructing a metallic housing, where such metallic housing may further comprise waveguide structures as part of a housing, applying a coating to a housing, and assembling connectors and coaxial transmission lines into a housing.

A method according to embodiments of the invention may be where waveguide structures may further comprise a coaxial to waveguide transition and impedance transformer at each input, a 2:1 waveguide combiner for each pair of said coaxial to waveguide transition and impedance transformers, a single ridged waveguide transmission line for each 2:1 waveguide combiner, a 2:1 coupled waveguide combiner for each pair of said single ridged waveguide transmission lines, and a mechanical stress relief output waveguide to coaxial transition at the output. A method may include waveguide structures that may be machined from the same material as a housing, as, for example, a single constructed piece. A method may include assembling connectors and coaxial transmission lines into a housing that may further comprise electrically and/or mechanically connecting connectors center conductors to a coaxial to waveguide transition and impedance transformer at each input, and to a mechanical stress relief output waveguide to coaxial transition at an output. A method may include connectors that may be N-Type connectors, or other suitable connector types. A method may be where a coating may be a conductive metallic coating, e.g., silver plating, or any other suitable coating. A method may include assembling connectors and/or coaxial transmission lines into a housing, and may further comprises assembling a brass push plate, for example, at each connector to housing interface.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A power combiner comprising:

an electrical signal power combiner housing;

a first pair of input ports and a second pair of input ports, wherein each said input port connects to an input coaxial transmission line into said power combiner housing;

a plurality of coaxial transmission line to waveguide transitions within said housing, wherein each said input coaxial transmission line connects to a coaxial input of one of each coaxial to waveguide transitions;

a first waveguide junction within said housing connected to each of two waveguide transitions from said first pair of input ports, and having a waveguide output;

a second waveguide junction within said housing connected each of two waveguide transitions from said second pair of input ports, and having a waveguide output;

a first waveguide transmission line within said housing connected at one end to an output of said first waveguide junction and at the other end to a third waveguide junction within said housing;

a second waveguide transmission line within said housing connected at one end to said second waveguide junction and at the other end to said third waveguide junction;

a mechanical stress relief waveguide within said housing connected at one end to an output of said third waveguide junction, and connected at the other end to a waveguide to coaxial transmission line transition within said housing; and an output coaxial transmission line connected at one end to said waveguide to coaxial transmission line transition, and at the other end output of said housing to an output port.

2. The power combiner of claim 1, wherein said input ports and said output port is a radio frequency (RF) connector.

3. The power combiner of claim 1, wherein said first waveguide transmission line and said second waveguide transmission line are each single ridged waveguide.

4. The power combiner of claim 1, wherein said plurality of coaxial transmission line to waveguide transitions and said waveguide to coaxial transmission line transition are each a current probe transition type.

5. The power combiner of claim 1, wherein said mechanical stress relief waveguide is shaped with two right angle bends to allow expansion and contraction with a changing self temperature.

6. The power combiner of claim 5, wherein said mechanical stress relief waveguide forms a mechanical stress relief loop.

7. The power combiner of claim 1, wherein coaxial transmission lines further comprise a PTFE insulator material between a center conductor and the outer conductor.

8. The power combiner of claim 7, wherein said plurality of coaxial transmission line to waveguide transitions and said waveguide to coaxial transmission line transition have mechanical flexibility at an interface between said PTFE and an outer conductor of said waveguide transitions, to allow expansion and contraction with a changing self temperature.

9. The power combiner of claim 1, wherein said plurality of coaxial transmission line to waveguide transitions further comprise input 50 ohms impedance at each input, and a combined output impedance of 25 ohms.

10. The power combiner of claim 9, wherein said waveguide to coaxial transmission line transition further comprises input 25 ohms impedance at each input, and a combined output impedance of 50 ohms.

11. The power combiner of claim 1, wherein said first waveguide transmission line and said second waveguide transmission line each form part of a cooling structure providing thermal dissipation to said housing.

12. (ORIGINAL The power combiner of claim 1, wherein said power combiner is operable to combine electrical signals input to said power combiner into a combined total power electrical signal output.

13. A radio frequency (RF) electrical signal power combiner comprising:

four RF input ports, wherein each said input port further comprises an RF connector attached to an exterior of said RF electrical signal power combiner, and attached 50 ohms coaxial transmission line into an interior of said electrical signal power combiner;

four coaxial to waveguide transitions, each electrically connected to each said 50 ohms coaxial transmission line, in pairs;

two 2:1 single ridged waveguide combiners and impedance transformers, each operably combining two input RF electrical signals into a combined output power electrical signal, and operably transforming said input RF electrical signals at said 50 ohms impedances to an output 25 ohms impedance;

two RF waveguide transmission lines, each electrically operably connected to the output of said single ridged waveguide combiners and impedance transformers, each with transmission line impedance of 25 ohms, and each mechanically attached to an interior of a housing, said mechanical attachment providing for thermal dissipation of heat generated by said electrical signal power combiner;

a single ridged coupled waveguide 2:1 power combiner electrically operably combining two inputs from each of two said RF waveguide transmission lines, said combining primarily by electrical coupling, and having input impedance of 25 ohms and output impedance of 50 ohms;

a thermal stress relief half-loop waveguide transmission line connected to said output of said single ridged coupled waveguide 2:1 power combiner;

a 50 ohms coaxial transmission line connected to said thermal stress relief half-loop waveguide transmission line from the interior of said electrical signal power combiner to the exterior of said RF electrical signal power combiner; and an RF output ports, wherein said output port further comprises an RF connector attached to an exterior of said RF electrical signal power combiner, and attached to said 50 ohms coaxial transmission line from an interior of said electrical signal power combiner.

14. A method of constructing an electrical signal power combiner comprising:

constructing a metallic housing, wherein said metallic housing further comprises waveguide structures as part of said housing;

applying a coating to said housing; and assembling one or more connectors and coaxial transmission lines into said housing, wherein at least one of the coaxial connectors is an N-Type connector, wherein said coating is a conductive metallic coating.

15. The method of claim 14, wherein said waveguide structures further comprise a coaxial to waveguide transition and impedance transformer at each input, a 2:1 waveguide combiner for each pair of said coaxial to waveguide transition and impedance transformers, a single ridged waveguide transmission line for each 2:1 waveguide combiner, a 2:1 coupled waveguide combiner for each pair of said single ridged waveguide transmission lines, and a mechanical stress relief output waveguide to coaxial transition at an output.

16. The method of claim 14, wherein said waveguide structures are machined from a same material as said housing, as a single constructed piece.

17. The method of claim 14, wherein said assembling connectors and coaxial transmission lines into said housing further comprises electrically and mechanically connecting a connectors center conductors to a coaxial to waveguide transition and impedance transformer at each input, and to a mechanical stress relief output waveguide to coaxial transition at an output.

* * * * *